(12) United States Patent
Bullard et al.

(10) Patent No.: US 8,638,336 B2
(45) Date of Patent: Jan. 28, 2014

(54) METHODS AND SYSTEMS FOR REMOTING THREE DIMENSIONAL GRAPHICAL DATA

(75) Inventors: Justin Bullard, Wilton Manors, FL (US); Franklyn Peart, Davie, FL (US); Terry Treder, Highland Beach, FL (US); Derek Thorslund, Coral Springs, FL (US); Brad Anderson, Fort Lauderale, FL (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 965 days.

(21) Appl. No.: 12/254,810

(22) Filed: Oct. 20, 2008

(65) Prior Publication Data

US 2009/0102838 A1    Apr. 23, 2009

Related U.S. Application Data

(60) Provisional application No. 60/981,484, filed on Oct. 20, 2007.

(51) Int. Cl.
    *G06T 1/00* (2006.01)
    *G06T 15/00* (2011.01)
    *G06F 15/00* (2006.01)
    *G06F 9/46* (2006.01)

(52) U.S. Cl.
    USPC ............ 345/522; 345/501; 718/104; 718/105

(58) Field of Classification Search
    USPC ........................... 345/501, 522; 718/104, 105
    See application file for complete search history.

(56) References Cited

U.S. PATENT DOCUMENTS

| 4,928,247 | A  |   | 5/1990  | Doyle et al.           |         |
|-----------|----|---|---------|------------------------|---------|
| 5,953,506 | A  | * | 9/1999  | Kalra et al.           | 709/231 |
| 6,466,971 | B1 | * | 10/2002 | Humpleman et al.       | 709/220 |
| 6,546,419 | B1 | * | 4/2003  | Humpleman et al.       | 709/223 |
| 6,763,380 | B1 | * | 7/2004  | Mayton et al.          | 709/224 |
| 6,798,417 | B1 |   | 9/2004  | Taylor                 |         |
| 7,062,527 | B1 |   | 6/2006  | Tyrrell, III           |         |

(Continued)

FOREIGN PATENT DOCUMENTS

| EP | 1047240    | 10/2000 |
| WO | WO-9944121 | 9/1999  |

OTHER PUBLICATIONS

International Search Report for PCT/US2008/080561 (Feb. 2009).
Written Opinion for PCT/US2008/080561 (Feb. 2009).

(Continued)

*Primary Examiner* — David T Welch
(74) *Attorney, Agent, or Firm* — Foley and Lardner LLP; John D. Lanza

(57) ABSTRACT

Systems and methods for remotely displaying three dimensional graphical data, include a local computing machine that communicates with a remote computing machine via a connection. An application executing on the local computing machine, generates three dimensional graphics commands which are intercepted and transferred to either the remote computing machine or a computing element on the local computing machine. Determining where to transfer the three dimensional graphics commands requires: an analysis of the application to obtain application specific characteristics; an analysis of the remote computing machine to obtain the capabilities of the remote computing machine; an analysis of the local computing machine to obtain the capabilities of the local computing machine; and an analysis of the connection to determine characteristics of the connection. A determination is made in response to obtaining the application characteristics, the remote computing machine capabilities, the local computing machine capabilities and the connection characteristics.

46 Claims, 12 Drawing Sheets

(56) References Cited

U.S. PATENT DOCUMENTS

| | | |
|---|---|---|
| 7,139,983 B2 | 11/2006 | Kelts |
| 2002/0099818 A1* | 7/2002 | Russell et al. ............... 709/224 |
| 2002/0116491 A1* | 8/2002 | Boyd et al. .................. 709/224 |
| 2003/0189574 A1 | 10/2003 | Ramsey |
| 2004/0199574 A1* | 10/2004 | Franco et al. ............... 709/201 |
| 2005/0104889 A1* | 5/2005 | Clemie et al. ............... 345/522 |
| 2005/0201291 A1* | 9/2005 | Gluck ........................ 370/241 |
| 2005/0210138 A1* | 9/2005 | Zigmond et al. ............ 709/227 |
| 2006/0082583 A1* | 4/2006 | Leichtling et al. ........... 345/522 |
| 2006/0242152 A1* | 10/2006 | Tanaka et al. ................ 707/10 |
| 2007/0174429 A1* | 7/2007 | Mazzaferri et al. .......... 709/218 |
| 2007/0204314 A1* | 8/2007 | Hasek et al. ................. 725/100 |
| 2007/0244987 A1* | 10/2007 | Pedersen et al. ............. 709/217 |
| 2007/0245409 A1* | 10/2007 | Harris et al. ................. 726/5 |
| 2011/0102443 A1 | 5/2011 | Dror et al. |

OTHER PUBLICATIONS

Examination Report regarding EP 08839203.0 mailed on Jan. 19, 2011.
Chinese Office Action on 200880112228.2 dated Jun. 26, 2012.
Chinese Office Action on 200880112228.2 dated Jan. 14, 2013.
European Examination Report on 08839203.0 dated Jan. 28, 2013.
Chinese Office Action on 200880112228.2 dated Jul. 3, 2013.

* cited by examiner

METHODS AND SYSTEMS FOR REMOTING THREE DIMENSIONAL GRAPHICAL DATA

FIELD OF THE INVENTION

This application relates generally to remoting graphical data.

BACKGROUND OF THE INVENTION

Providing remote access to applications that generate or otherwise use enhanced graphics, (e.g. three dimensional graphics or desktops can be difficult to accomplish. Unlike elementary graphics such as two-dimensional graphics; enhanced graphics typically require a great deal of processing resources and memory. These requirements can degrade an end-user's experience by retarding the application's functionality and ability to output or generate the enhanced graphics.

Various methods exist for alleviating the system strain introduced by enhanced graphics. Some of these methods specifically address the affect enhanced graphics have on systems providing remote access to applications.

SUMMARY OF THE INVENTION

In one aspect, described herein is a method for remoting three dimensional graphical data. The includes intercepting, by a local computing machine in a distributed computing system, three dimensional graphics commands that are generated by an application executing on the local computing machine. The method further includes analyzing the application to obtain application specific characteristics of the application. Analyzing the remote computing machine and the local computing machine to obtain the capabilities of the remote computing machine and the capabilities of the local computing machine. The connection between the local computing machine and the remote computing machine is further analyzed to obtain characteristics of the connection. In response to obtaining the application specific characteristics, the capabilities of the remote computing machine, the capabilities of the local computing machine and the connection characteristics, the three dimensional graphics commands are transferred to either the remote computing machine, or a computing element on the local computing machine that receives as input three dimensional graphics commands and outputs three dimensional graphical data.

One embodiment of the method includes intercepting primitive three dimensional graphics commands, while another embodiment of the method includes intercepting high level three dimensional graphics commands.

In another embodiment of the method, analyzing the remote computing machine includes determining whether the remote computing machine has a computing element that can receive as input three dimensional graphics commands and output three dimensional graphical data.

Still other embodiments of the method include analyzing the remote computing machine to determine whether there is a score associated with the remote computing machine. That score can, in some embodiments, be associated with the hardware and the software configuration of the remote computing machine.

In one embodiment of the method, analyzing the remote computing machine includes identifying codecs available on the remote computing machine.

Other embodiments of the method include analyzing the local computing machine to determine whether the local computing machine has a computing element having the capability to receive three dimensional graphics commands and output three dimensional graphical data.

Analyzing the connection can, in one embodiment, include determining an amount of bandwidth available in the connection.

Transferring the three dimensional graphics can in some embodiments include transferring the commands to the computing element on the local computing machine. In such an embodiment, the computing element can render three dimensional graphical data from the three dimensional graphics commands. The rendered three dimensional graphical data is then transmitted by the local computing machine to the remote computing machine. Transmission to the local computing machine can further include receiving, by the remote computing machine, the three dimensional graphical data, and then displaying the three dimensional graphical data. In some embodiments, transferring to a computing element on the local computing machine includes transferring the three dimensional graphics commands to a graphics engine on the local computing machine. In other embodiments, transferring to a computing element on the local computing machine includes transferring the three dimensional graphics commands to a processor on the local computing machine, where the processor is capable of receiving three dimensional graphics commands and outputting three dimensional graphical data. Still other embodiments include transferring the three dimensional graphics commands to an application executing on the local computing machine, the application receiving three dimensional graphics commands and outputting three dimensional graphical data.

In one embodiment of the method, transferring further comprises transferring three dimensional graphics commands to the remote computing machine, where the remote computing machine has a computing element thereon. The computing element on the remote computing machine can receive the three dimensional graphics commands, and output three dimensional graphical data. Further embodiments include transferring the three dimensional graphics commands to a graphics engine on the remote computing machine. Still other embodiments include transferring the three dimensional graphics commands to a processor on the remote computing machine, where the processor is capable of receiving three dimensional graphics commands and outputting three dimensional graphical data. Transferring can further include transferring the three dimensional graphics commands to an application executing on the remote computing machine. The application, in this embodiment, can receive as input three dimensional graphics commands and output three dimensional graphical data. In still other embodiments, the remote computing machine displays the rendered three dimensional graphical data once it is outputted.

Embodiments of the method include transferring the three dimensional graphics commands to either the remote computing machine or the computing element on the local computing machine and waiting a predetermined period of time. After the predetermined period of time, the application specific characteristics, the remote computing machine's capabilities, the local computing machine's capabilities and the connection characteristics are re-obtained. The three dimensional graphics commands are then transferred to the other of the remote computing machine or the computing element on the local computing machine.

In still another embodiment, the three dimensional graphics commands are stored on a storage medium prior to transmission.

Yet another embodiment includes transferring three dimensional graphics commands to a computing element on the local computing machine, that is a computer hardware element capable of rendering three dimensional graphical data from graphics commands. Other embodiments include transferring three dimensional graphics commands to a computing element on the remote computing machine, the computing element comprising a computer hardware element that is capable of rendering three dimensional graphical data from graphics commands.

In another aspect, described herein is a system for remoting three dimensional graphical data. The system includes a local computing machine within a distributed computing system. The local computing machine intercepts three dimensional graphics commands that are generated by an application executing on the local computing machine. A computing element on the local computing machine can receive as input three dimensional graphics commands and output three dimensional graphical data. The system also includes a remote computing machine within the distributed computing system, where the remote computing machine communicates with the local computing machine via a connection installed between the local computing machine and the remote computing machine. The local computing machine executes an application to: analyze the application to obtain application specific characteristics of the application; analyze the remote computing machine to obtain capabilities of the remote computing machine; analyze the local computing machine to obtain capabilities of the local computing machine; analyze the connection to obtain characteristics of the connection; and determine, based on the application characteristics, the remote computing machine capabilities, the local computing machine capabilities, and the connection characteristics, whether to transfer the intercepted three dimensional graphics commands to the remote computing machine or the computing element on the local computing machine.

BRIEF DESCRIPTION OF THE DRAWINGS

The following figures depict certain illustrative embodiments of the present disclosure. Reference numerals included within these illustrative embodiments refer to like elements further described in the present disclosure. The embodiments depicted are illustrative of the present disclosure and do not limit the scope of the present disclosure

DETAILED DESCRIPTION OF THE DRAWINGS

Figure 1A:
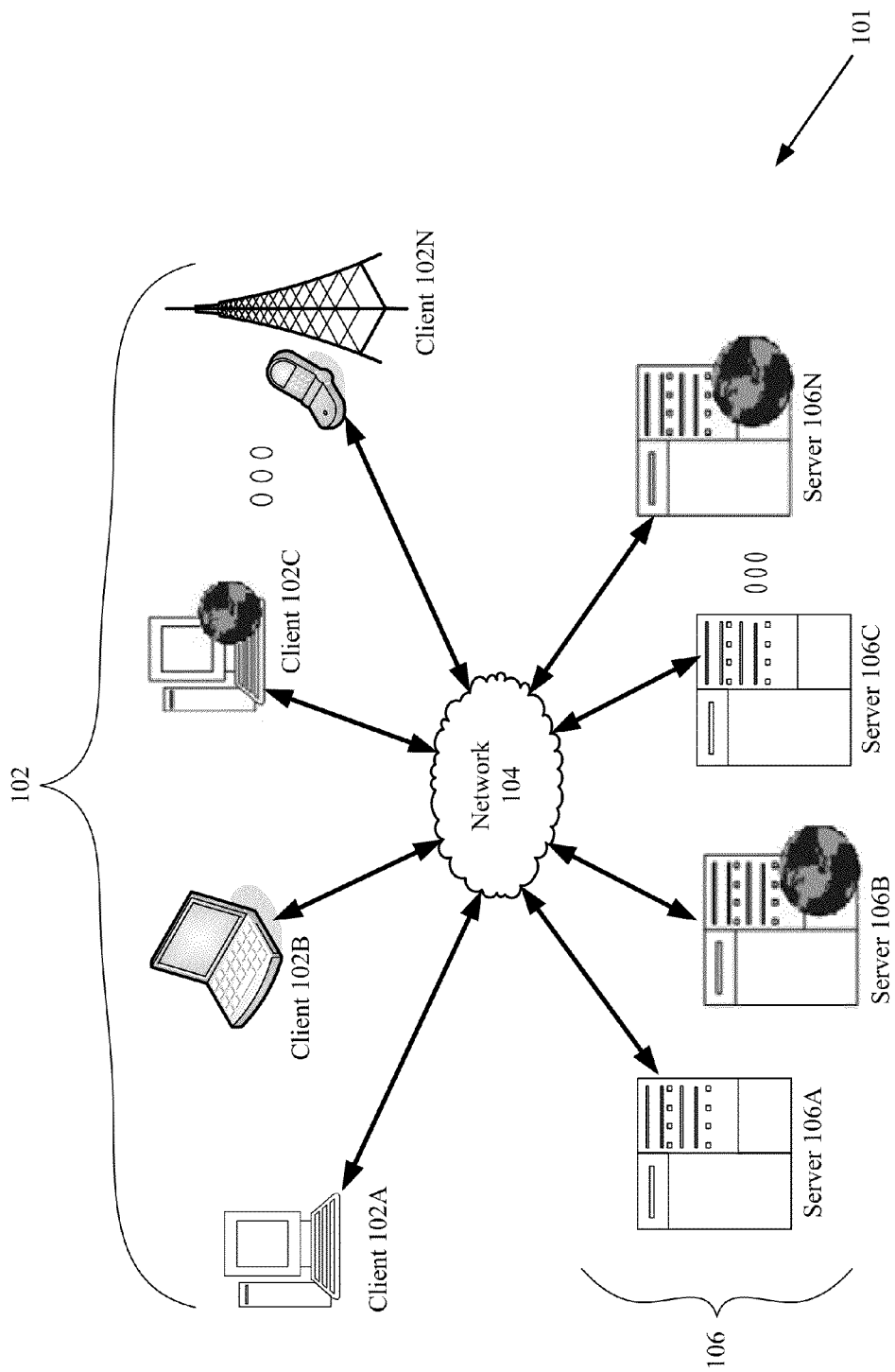
FIG. 1A is a block diagram illustrative of an embodiment of a remote-access, networked environment with a client machine that communicates with a server.

FIG. 1A illustrates one embodiment of a computing environment 101 that includes one or more client machines 102A-102N in communication with servers 106A-106N, and a network 104 installed in between the client machines 102A-102N and the servers 106A-106N. In some embodiments, client machines 102A-10N may be referred to as a single client machine 102 or a single group of client machines 102, while servers may be referred to as a single server 106 or a single group of servers 106. One embodiment includes a single client machine 102 communicating with more than one server 106, another embodiment includes a single server 106 communicating with more than one client machine 102, while another embodiment includes a single client machine 102 communicating with a single server 106.

A client machine 102 within the computing environment may in some embodiments, be referenced by any one of the following terms: client machine(s) 102; client(s); client computer(s); client device(s); client computing device(s); client node(s); endpoint(s); endpoint node(s); or a second machine. The server 106 in some embodiments may be referenced by any one of the following terms: server(s), server farm(s), host computing device(s), or a first machine(s).

The client machine 102 can in some embodiments execute, operate or otherwise provide an application that can be any one of the following: software; a program; executable instructions; a web browser; a web-based client; a client-server application; a thin-client computing client; an ActiveX control; a Java applet; software related to voice over internet protocol (VoIP) communications like a soft IP telephone; an application for streaming video and/or audio; an application for facilitating real-time-data communications; a HTTP client; a FTP client; an Oscar client; a Telnet client; or any other type and/or form of executable instructions capable of executing on client machine 102. Still other embodiments may include a computing environment 101 with an application that is any of either server-based or remote-based, and an application that is executed on the server 106 on behalf of the client machine 102. Further embodiments of the computing environment 101 include a server 106 configured to display output graphical data to a client machine 102 using a thin-client or remote-display protocol, where the protocol used can be any one of the following protocols: the Independent Computing Architecture (ICA) protocol manufactured by Citrix Systems, Inc. of Ft. Lauderdale, Fla.; or the Remote Desktop Protocol (RDP) manufactured by the Microsoft Corporation of Redmond, Wash.

In one embodiment, the client machine 102 can be a virtual machine 102C such as those manufactured by XenSolutions, Citrix Systems, IBM, VMware, or any other virtual machine able to implement the methods and systems described herein.

The computing environment 101 can, in some embodiments, include more than one server 106A-106N where the servers 106A-106N are: grouped together as a single server 106 entity, logically-grouped together in a server farm 106; geographically dispersed and logically grouped together in a server farm 106, located proximate to each other and logically grouped together in a server farm 106. Geographically dispersed servers 106A-106N within a server farm 106 can, in some embodiments, communicate using a WAN, MAN, or LAN, where different geographic regions can be characterized as: different continents; different regions of a continent; different countries; different states; different cities; different campuses; different rooms; or any combination of the preceding geographical locations. In some embodiments the server farm 106 may be administered as a single entity or in other embodiments may include multiple server farms 106. The computing environment 101 can include more than one server 106A-106N grouped together in a single server farm 106 where the server farm 106 is heterogeneous such that one server 106A-106N is configured to operate according to a first type of operating system platform (e.g., WINDOWS NT, manufactured by Microsoft Corp. of Redmond, Wash.), while one or more other servers 106A-106N are configured to operate according to a second type of operating system platform (e.g., Unix or Linux); more than one server 106A-106N is configured to operate according to a first type of operating system platform (e.g., WINDOWS NT), while another server 106A-106N is configured to operate according to a second type of operating system platform (e.g., Unix or Linux); or more than one server 106A-106N is configured to operate according to a first type of operating system platform (e.g., WINDOWS NT) while more than one of the other servers 106A-106N are configured to operate according to a second type of operating system platform (e.g., Unix or Linux).

The computing environment 101 can in some embodiments include a server 106 or more than one server 106 configured to provide the functionality of any one of the following server types: a file server; an application server; a web server; a proxy server; an appliance; a network appliance; a gateway; an application gateway; a gateway server; a virtualization server; a deployment server; a SSL VPN server; a firewall; a web server; an application server or as a master application server; a server 106 configured to operate as an active direction; a server 106 configured to operate as application acceleration application that provides firewall functionality, application functionality, or load balancing functionality, or other type of computing machine configured to operate as a server 106. In some embodiments, a server 106 may include a remote authentication dial-in user service such that the server 106 is a RADIUS server. Embodiments of the computing environment 101 where the server 106 comprises an appliance, the server 106 can be an appliance manufactured by any one of the following manufacturers: the Citrix Application Networking Group; Silver Peak Systems, Inc; Riverbed Technology, Inc.; F5 Networks, Inc.; or Juniper Networks, Inc. Some embodiments include a server 106 with the following functionality: a first server 106A that receives requests from a client machine 102, forwards the request to a second server 106B, and responds to the request generated by the client machine with a response from the second server 106B; acquires an enumeration of applications available to the client machines 102 and address information associated with a server 106 hosting an application identified by the enumeration of applications; presents responses to client requests using a web interface; communicates directly with the client 102 to provide the client 102 with access to an identified application; receives output data, such as display data, generated by an execution of an identified application on the server 106.

The server 106 can be configured to execute any one of the following applications: an application providing a thin-client computing or a remote display presentation application; any portion of the CITRIX ACCESS SUITE by Citrix Systems, Inc. like the METAFRAME or CITRIX PRESENTATION SERVER; MICROSOFT WINDOWS Terminal Services manufactured by the Microsoft Corporation; or an ICA client, developed by Citrix Systems, Inc. Another embodiment includes a server 106 configured to execute an application so that the server may function as an application server such as any one of the following application server types: an email server that provides email services such as MICROSOFT EXCHANGE manufactured by the Microsoft Corporation; a web or Internet server; a desktop sharing server; or a collaboration server. Still other embodiments include a server 106 that executes an application that is any one of the following types of hosted servers applications: GOTOMEETING provided by Citrix Online Division, Inc.; WEBEX provided by WebEx, Inc. of Santa Clara, Calif.; or Microsoft Office LIVE MEETING provided by Microsoft Corporation.

In one embodiment, the server 106 may be a virtual machine 106B such as those manufactured by XenSolutions, Citrix Systems, IBM, VMware, or any other virtual machine able to implement the methods and systems described herein.

Client machines 102 may function, in some embodiments, as a client node seeking access to resources provided by a server 106, or as a server 106 providing other clients 102A-102N with access to hosted resources. One embodiment of the computing environment 101 includes a server 106 that provides the functionality of a master node. Communication between the client machine 102 and either a server 106 or servers 106A-106N can be established via any of the following methods: direct communication between a client machine 102 and a server 106A-106N in a server farm 106; a client machine 102 that uses a program neighborhood application to communicate with a server 106a-106n in a server farm 106; or a client machine 102 that uses a network 104 to communicate with a server 106A-106N in a server farm 106. One embodiment of the computing environment 101 includes a client machine 102 that uses a network 104 to request that applications hosted by a server 106A-106N in a server farm 106 execute, and uses the network 104 to receive from the server 106A-106N graphical display output representative of the application execution. In other embodiments, a master node provides the functionality required to identify and provide address information associated with a server 106 hosting a requested application. Still other embodiments include a master node that can be any one of the following: a server 106A-106N within the server farm 106; a remote computing machine connected to the server farm 106 but not included within the server farm 106; a remote computing machine connected to a client 102 but not included within a group of client machines 102; or a client machine 102.

The network 104 between the client machine 102 and the server 106 is a connection over which data is transferred between the client machine 102 and the server 106. Although the illustration in FIG. 1A depicts a network 104 connecting the client machines 102 to the servers 106, other embodiments include a computing environment 101 with client machines 102 installed on the same network as the servers 106. Other embodiments can include a computing environment 101 with a network 104 that can be any of the following: a local-area network (LAN); a metropolitan area network (MAN); a wide area network (WAN); a primary network 104 comprised of multiple sub-networks 104' located between the client machines 102 and the servers 106; a primary public network 104 with a private sub-network 104'; a primary private network 104 with a public sub-network 104'; or a primary private network 104 with a private sub-network 104'. Still further embodiments include a network 104 that can be any of the following network types: a point to point network; a broadcast network; a telecommunications network; a data communication network; a computer network; an ATM (Asynchronous Transfer Mode) network; a SONET (Synchronous Optical Network) network; a SDH (Synchronous Digital Hierarchy) network; a wireless network; a wireline network; a network 104 that includes a wireless link where the wireless link can be an infrared channel or satellite band; or any other network type able to transfer data from client machines 102 to servers 106 and vice versa to accomplish the methods and systems described herein. Network topology may differ within different embodiments, possible network topologies include: a bus network topology; a star network topology; a ring network topology; a repeater-based network topology; a tiered-star network topology; or any other network topology able transfer data from client machines 102 to servers 106, and vice versa, to accomplish the methods and systems described herein. Additional embodiments may include a network 104 of mobile telephone networks that use a protocol to communicate among mobile devices, where the protocol can be any one of the following: AMPS; TDMA; CDMA; GSM; GPRS UMTS; or any other protocol able to transmit data among mobile devices to accomplish the systems and methods described herein.

Figure 1B:
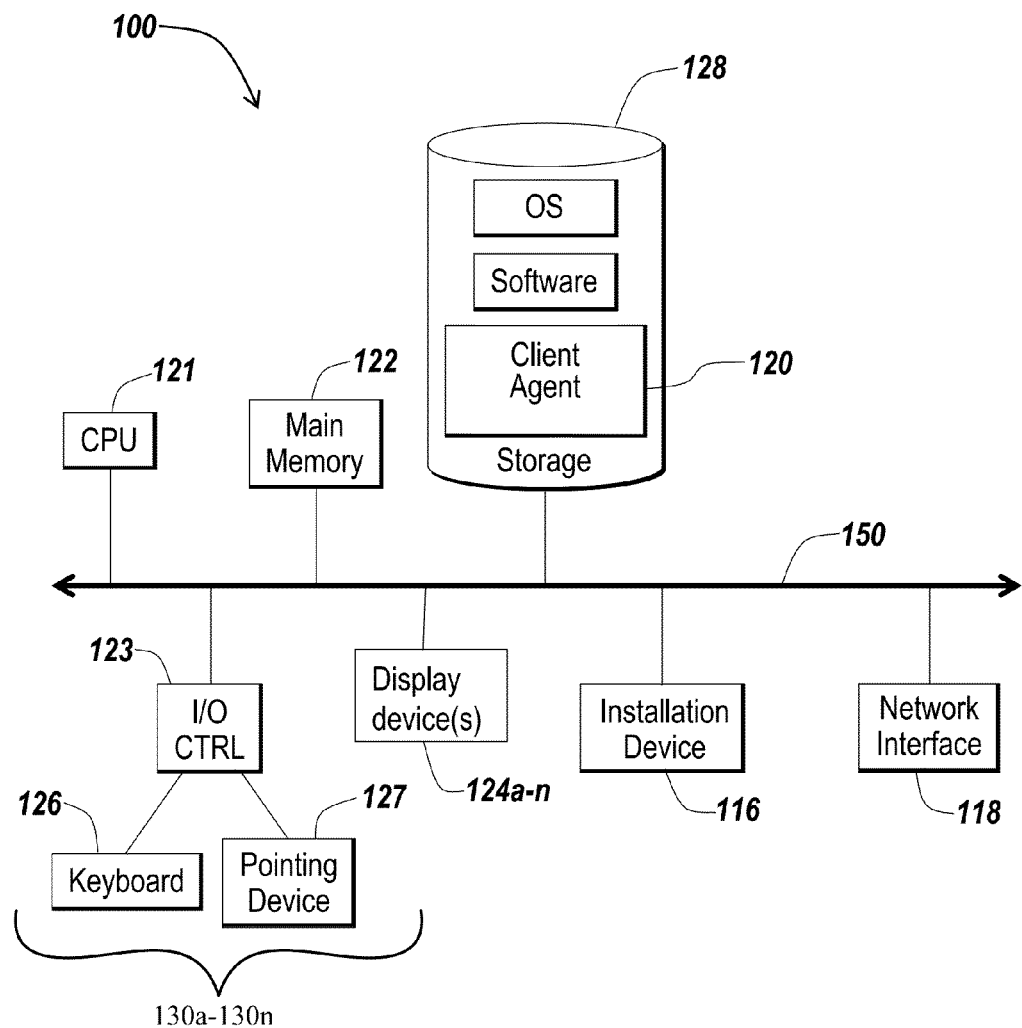
FIGS. 1B and 1C are block diagrams illustrative of an embodiment of computing machines for practicing the methods and systems described herein.

Illustrated in FIG. 1B is an embodiment of a computing device 100, where the client machine 102 and server 106 illustrated in FIG. 1A can be deployed as and/or executed on any embodiment of the computing device 100 illustrated and described herein. Included within the computing device 100 is a system bus 150 that communicates with the following components: a central processing unit 121; a main memory 122; storage memory 128; an input/output (I/O) controller 123; display devices 124A-124N; an installation device 116; and a network interface 118. In one embodiment, the storage memory 128 includes: an operating system, software routines, and a client agent 120. The I/O controller 123, in some embodiments, is further connected to a key board 126, and a pointing device 127. Other embodiments may include an I/O controller 123 connected to more than one input/output device 130A-130N.

Figure 1C:
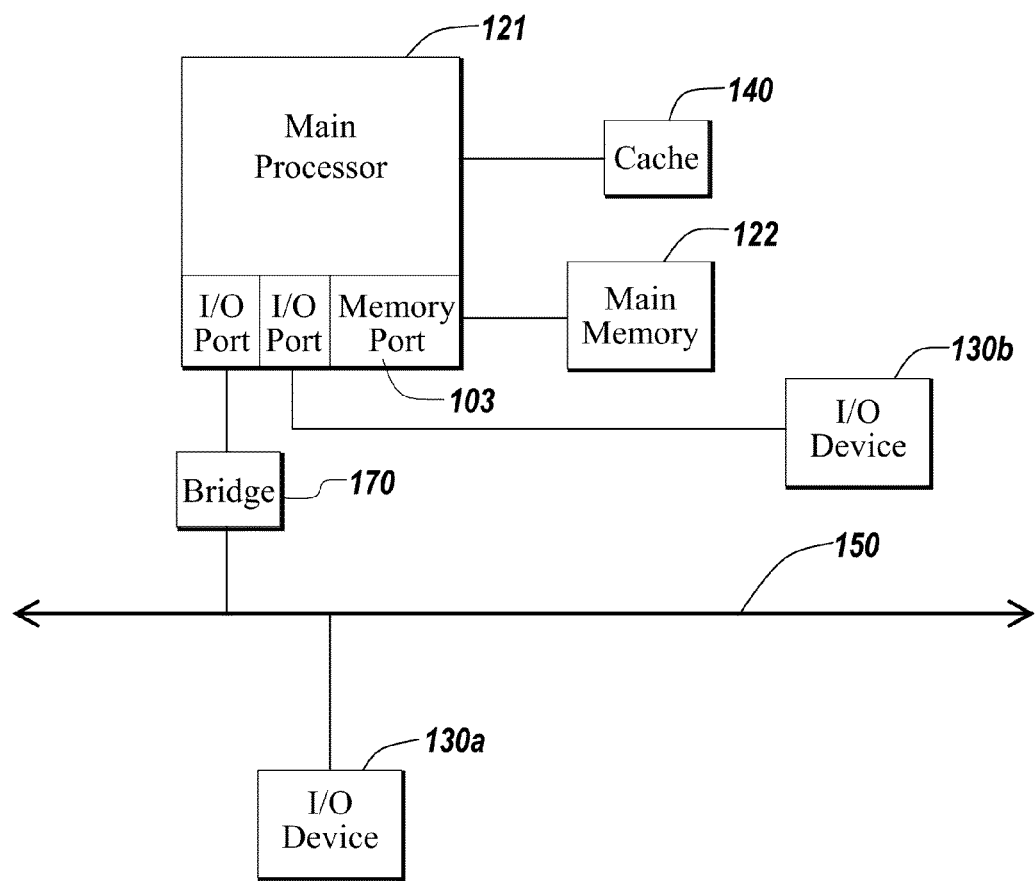

FIG. 1C illustrates one embodiment of a computing device 100, where the client machine 102 and server 106 illustrated in FIG. 1A can be deployed as and/or executed on any embodiment of the computing device 100 illustrated and described herein. Included within the computing device 100 is a system bus 150 that communicates with the following components: a bridge 170, and a first I/O device 130A. In another embodiment, the bridge 170 is in further communication with the central processing unit 121, where the central processing unit 121 can further communicate with a second I/O device 130B, a main memory 122, and a cache memory 140. Included within the central processing unit 121, are I/O ports, a memory port 103, and a main processor.

Embodiments of the computing machine 100 can include a central processing unit 121 characterized by any one of the following component configurations: logic circuits that respond to and process instructions fetched from the main memory unit 122; a microprocessor unit, such as: those manufactured by Intel Corporation; those manufactured by Motorola Corporation; those manufactured by Transmeta Corporation of Santa Clara, Calif.; the RS/6000 processor such as those manufactured by International Business Machines; a processor such as those manufactured by Advanced Micro Devices; or any other combination of logic circuits capable of executing the systems and methods described herein. Still other embodiments of the central processing unit 122 may include any combination of the following: a microprocessor, a microcontroller, a central processing unit with a single processing core, a central processing unit with two processing cores, or a central processing unit with more than one processing cores.

One embodiment of the computing machine 100 includes a central processing unit 121 that communicates with cache memory 140 via a secondary bus also known as a backside bus, while another embodiment of the computing machine 100 includes a central processing unit 121 that communicates with cache memory via the system bus 150. The local system bus 150 can, in some embodiments, also be used by the central processing unit to communicate with more than one type of I/O devices 130A-130N. In some embodiments, the local system bus 150 can be any one of the following types of buses: a VESA VL bus; an ISA bus; an EISA bus; a MicroChannel Architecture (MCA) bus; a PCI bus; a PCI-X bus; a PCI-Express bus; or a NuBus. Other embodiments of the computing machine 100 include an I/O device 130A-130N that is a video display 124 that communicates with the central processing unit 121 via an Advanced Graphics Port (AGP). Still other versions of the computing machine 100 include a processor 121 connected to an I/O device 130A-130N via any one of the following connections: HyperTransport, Rapid I/O, or InfiniBand. Further embodiments of the computing machine 100 include a communication connection where the processor 121 communicates with one I/O device 130A using a local interconnect bus and with a second I/O device 130B using a direct connection.

Included within some embodiments of the computing device 100 is each of a main memory unit 122 and cache memory 140. The cache memory 140 will in some embodiments be any one of the following types of memory: SRAM; BSRAM; or EDRAM. Other embodiments include cache memory 140 and a main memory unit 122 that can be any one of the following types of memory: Static random access memory (SRAM), Burst SRAM or SynchBurst SRAM (BSRAM), Dynamic random access memory (DRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Enhanced DRAM (EDRAM), synchronous DRAM (SDRAM), JEDEC SRAM, PC100 SDRAM, Double Data Rate SDRAM (DDR SDRAM), Enhanced SDRAM (ESDRAM), SyncLink DRAM (SLDRAM), Direct Rambus DRAM (DRDRAM), Ferroelectric RAM (FRAM), or any other type of memory device capable of executing the systems and methods described herein. The main memory unit 122 and/or the cache memory 140 can in some embodiments include one or more memory devices capable of storing data and allowing any storage location to be directly accessed by the central processing unit 121. Further embodiments include a central processing unit 121 that can access the main memory 122 via one of either: a system bus 150; a memory port 103; or any other connection, bus or port that allows the processor 121 to access memory 122.

One embodiment of the computing device 100 provides support for any one of the following installation devices 116: a floppy disk drive for receiving floppy disks such as 3.5-inch, 5.25-inch disks or ZIP disks, a CD-ROM drive, a CD-R/RW drive, a DVD-ROM drive, tape drives of various formats, USB device, a bootable medium, a bootable CD, a bootable CD for GNU/Linux distribution such as KNOPPIX®, a harddrive or any other device suitable for installing applications or software. Applications can in some embodiments include a client agent 120, or any portion of a client agent 120. The computing device 100 may further include a storage device 128 that can be either one or more hard disk drives, or one or more redundant arrays of independent disks; where the storage device is configured to store an operating system, software, programs applications, or at least a portion of the client agent 120. A further embodiment of the computing device 100 includes an installation device 116 that is used as the storage device 128.

Furthermore, the computing device 100 may include a network interface 118 to interface to a Local Area Network (LAN), Wide Area Network (WAN) or the Internet through a variety of connections including, but not limited to, standard telephone lines, LAN or WAN links (e.g., 802.11, T1, T3, 56 kb, X.25, SNA, DECNET), broadband connections (e.g., ISDN, Frame Relay, ATM, Gigabit Ethernet, Ethernet-over-SONET), wireless connections, or some combination of any or all of the above. Connections can also be established using a variety of communication protocols (e.g., TCP/IP, IPX, SPX, NetBIOS, Ethernet, ARCNET, SONET, SDH, Fiber Distributed Data Interface (FDDI), RS232, RS485, IEEE 802.11, IEEE 802.11a, IEEE 802.11b, IEEE 802.11g, CDMA, GSM, WiMax and direct asynchronous connections). One version of the computing device 100 includes a network interface 118 able to communicate with additional computing devices 100' via any type and/or form of gateway or tunneling protocol such as Secure Socket Layer (SSL) or Transport Layer Security (TLS), or the Citrix Gateway Protocol manufactured by Citrix Systems, Inc. Versions of the network interface 118 can comprise any one of: a built-in network adapter; a network interface card; a PCMCIA network card; a card bus network adapter; a wireless network adapter; a USB network adapter; a modem; or any other device suitable for interfacing the computing device 100 to a network capable of communicating and performing the methods and systems described herein.

Embodiments of the computing device 100 include any one of the following I/O devices 130A-130N: a keyboard 126; a pointing device 127; mice; trackpads; an optical pen; trackballs; microphones; drawing tablets; video displays; speakers; inkjet printers; laser printers; and dye-sublimation printers; or any other input/output device able to perform the methods and systems described herein. An I/O controller 123 may in some embodiments connect to multiple I/O devices 103A-130N to control the one or more I/O devices. Some embodiments of the I/O devices 130A-130N may be configured to provide storage or an installation medium 116, while others may provide a universal serial bus (USB) interface for receiving USB storage devices such as the USB Flash Drive line of devices manufactured by Twintech Industry, Inc. Still other embodiments of an I/O device 130 may be a bridge between the system bus 150 and an external communication bus, such as: a USB bus; an Apple Desktop Bus; an RS-232 serial connection; a SCSI bus; a FireWire bus; a FireWire 800 bus; an Ethernet bus; an AppleTalk bus; a Gigabit Ethernet bus; an Asynchronous Transfer Mode bus; a HIPPI bus; a Super HIPPI bus; a SerialPlus bus; a SCI/LAMP bus; a Fibre-Channel bus; or a Serial Attached small computer system interface bus.

In some embodiments, the computing machine 100 can connect to multiple display devices 124A-124N, in other embodiments the computing device 100 can connect to a single display device 124, while in still other embodiments the computing device 100 connects to display devices 124A-124N that are the same type or form of display, or to display devices that are different types or forms. Embodiments of the display devices 124A-124N can be supported and enabled by the following: one or multiple I/O devices 130A-130N; the I/O controller 123; a combination of I/O device(s) 130A-130N and the I/O controller 123; any combination of hardware and software able to support a display device 124A-124N; any type and/or form of video adapter, video card, driver, and/or library to interface, communicate, connect or otherwise use the display devices 124a-124n. The computing device 100 may in some embodiments be configured to use one or multiple display devices 124A-124N, these configurations include: having multiple connectors to interface to multiple display devices 124a-124n; having multiple video adapters, with each video adapter connected to one or more of the display devices 124A-124N; having an operating system configured to support multiple displays 124A-124N; using circuits and software included within the computing device 100 to connect to and use multiple display devices 124A-124N; and executing software on the main computing device 100 and multiple secondary computing devices to enable the main computing device 100 to use a secondary computing device's display as a display device 124A-124N for the main computing device 100. Still other embodiments of the computing device 100 may include multiple display devices 124A-124N provided by multiple secondary computing devices and connected to the main computing device 100 via a network.

In some embodiments of the computing machine 100, an operating system may be included to control task scheduling and access to system resources. Embodiments of the computing device 100 can run any one of the following operation systems: versions of the MICROSOFT WINDOWS operating systems such as WINDOWS 3.x; WINDOWS 95; WINDOWS 98; WINDOWS 2000; WINDOWS NT 3.51; WINDOWS NT 4.0; WINDOWS CE; WINDOWS XP; and WINDOWS VISTA; the different releases of the Unix and Linux operating systems; any version of the MAC OS manufactured by Apple Computer; OS/2, manufactured by International Business Machines; any embedded operating system; any real-time operating system; any open source operating system; any proprietary operating system; any operating systems for mobile computing devices; or any other operating system capable of running on the computing device and performing the operations described herein. One embodiment of the computing machine 100 has multiple operating systems installed thereon.

The computing machine 100 can be embodied in any one of the following computing devices: a computing workstation; a desktop computer; a laptop or notebook computer; a server; a handheld computer; a mobile telephone; a portable telecommunication device; a media playing device; a gaming system; a mobile computing device; a device of the IPOD family of devices manufactured by Apple Computer; any one of the PLAYSTATION family of devices manufactured by the Sony Corporation; any one of the Nintendo family of devices manufactured by Nintendo Co; any one of the XBOX family of devices manufactured by the Microsoft Corporation; or any other type and/or form of computing, telecommunications or media device that is capable of communication and that has sufficient processor power and memory capacity to perform the methods and systems described herein. In other embodiments the computing machine 100 can be a mobile device such as any one of the following mobile devices: a JAVA-enabled cellular telephone or personal digital assistant (PDA), such as the i55sr, i58sr, i85s, i88s, i90c, i95cl, or the im1100, all of which are manufactured by Motorola Corp; the 6035 or the 7135, manufactured by Kyocera; the i300 or i330, manufactured by Samsung Electronics Co., Ltd; the TREO 180, 270, 600, 650, 680, 700p, 700w, or 750 smart phone manufactured by Palm, Inc; any computing device that has different processors, operating systems, and input devices consistent with the device; or any other mobile computing device capable of performing the methods and systems described herein. Still other embodiments of the computing environment 101 include a mobile computing device 100 that can be any one of the following: any one series of Blackberry, or other handheld device manufactured by Research In Motion Limited; the iPhone manufactured by Apple Computer; any handheld or smart phone; a Pocket PC; a Pocket PC Phone; or any other handheld mobile device supporting Microsoft Windows Mobile Software.

Figure 2:
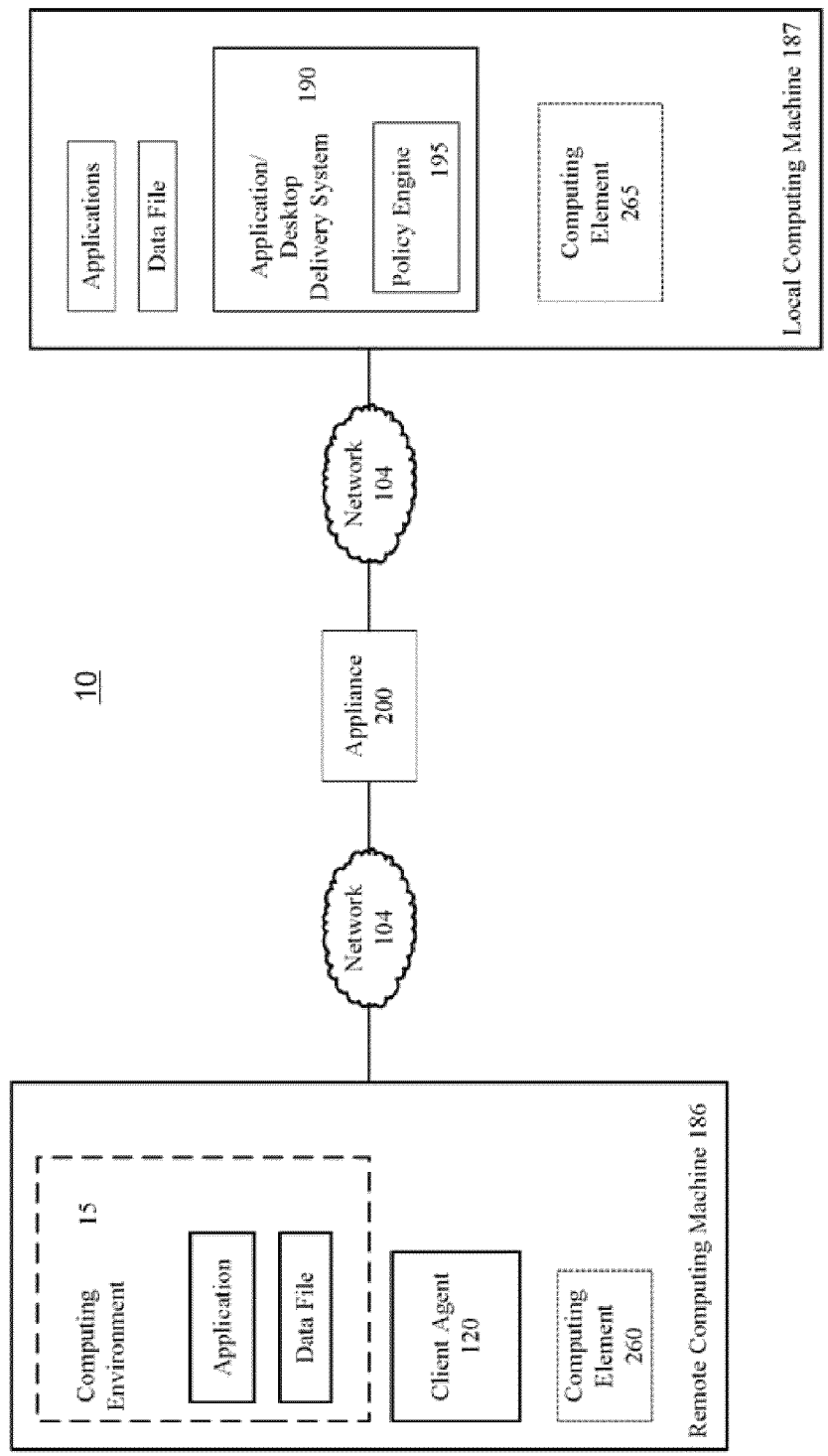
FIG. 2 depicts embodiments of a computing device.

Illustrated in FIG. 2 is one embodiment of a network environment 10. In brief overview, the network environment 10 comprises one or more remote computing machines 186 in communication with one or more local computing machines 187 via one or more networks 104, 104' (generally referred to as network(s) 104). Although FIG. 2 depicts networks 104, 104' installed between the local computing machine 187 and the remote computing machine 186, the local and remote computing machine 187, 186 may be installed on the same network 104. A network appliance can, in some embodiments, reside between the networks 104, 104' or in some other location. The remote computing machine 186 has a computing environment 15 within which applications execute and data files are stored. The remote computing machine 186 can also include a client agent 120 and a computing element 260. The local computing machine 187 has applications executing thereon and stores data files. An application or desktop delivery system 190 having a policy engine 195 can be included on the local computing machine 187 along with a computing element 265.

Further referring to FIG. 2 and in more detail, the remote computing machine 186 includes, in one embodiment, a computing environment 15 that has one or more applications executing therein. Further, the computing environment 15 can also store, in a repository such as a main memory 122 or cache 140, data files. In one embodiment, the application is a desktop, while in other embodiments the application is an application generating and outputting three dimensional graphical data. Still other embodiments include an application outputting graphical data that requires a greater amount of memory and processor resources than two dimensional graphics typically require. The client agent 120 included on the remote computing machine 186 can facilitate communication between the remote computing machine 186 and the appliance 200, or the remote computing machine 186 and the server 106. Additional embodiments include a client agent 120 that facilitates communication between the remote computing machine 186 and any additional computing device or appliance able to communicate over the network 104, 104'. The remote computing machine 186 may be referred to as a node or endpoint because in some embodiments, the remote computing machine 186 can act as a node on the network seeking access to applications and data files on the network 104, 104'. As a node, or endpoint, the remote computing machine 186 can also function as an application server that provides additional computing machines on the network 104, 104' with access to applications executing on the remote computing machine 186.

Included in the remote computing machine 186 is both a client agent 120 and a computing element 260. The client agent 120 can, in some embodiments, be used to determine where to render graphical data. In conjunction with an application executing on the local computing machine 187, information is gathered by the client agent 120 about the remote computing machine 186 to be used to determine whether graphical data can be rendered on the remote computing machine 187. The computing element 260 is an element in the remote computing machine 186 that receives, as input, graphics commands and outputs graphical data. In one embodiment the computing element 260 can be a graphical processing unit, while in other embodiments, the computing element 260 can be a graphics rendering program executing on the remote computing machine 187. In still another embodiment, the computing element 260 can be a processor configured to render graphics. Other embodiments include a computing element 260 that is a hardware chip integrated into the remote computing machine's 186 hardware for the purpose of rendering graphics. The computing element can include a single chip or multiple chips. In other embodiments, the computing element is a graphics processing unit appliance that includes one or more graphics processing units that render graphical data. In a graphics processing unit, the appliance can be a stand alone appliance such as the NVidia Quadro™ Plex device manufactured by NVIDIA CORPORATION of Santa Clara, Calif. In still other embodiments the computing element 260 can be a virtualized device or appliance.

The network(s) 104, 104' installed between the remote computing machine 186 and the local computing machine 187 can be any one of the above-described networks or network configurations.

In one embodiment, a remote computing machine 186 requests execution of an application program and the application delivery system 190, comprising a local computing machine 187, selects a method of executing the application program. In some embodiments, the local computing machine 187 receives credentials from the remote computing machine 186. In another embodiment, the local computing machine 187 receives a request for an enumeration of available applications from the remote computing machine 186. In one embodiment, in response to the request or receipt of credentials, the application delivery system 190 enumerates a plurality of application programs available to the remote computing machine 186. The application delivery system 190 receives a request to execute an enumerated application. The application delivery system 190 selects one of a predetermined number of methods for executing the enumerated application, for example, responsive to a policy of a policy engine. The application delivery system 190 may select a method of execution of the application enabling the remote computing machine 186 to receive application-output data generated by execution of the application program on a local computing machine 187. The application delivery system 190 may select a method of execution of the application enabling the remote computing machine 186 to execute the application program locally after retrieving a plurality of application files comprising the application. In yet another embodiment, the application delivery system 190 may select a method of execution of the application to stream the application via the network 104 to the remote computing machine 186.

A remote computing machine 186 may execute, operate or otherwise provide an application, which can be any type and/or form of software, program, or executable instructions such as any type and/or form of web browser, web-based client, client-server application, a thin-client computing client, an ActiveX control, or a Java applet, or any other type and/or form of executable instructions capable of executing on a remote computing machine 186. In some embodiments, the application may be a server-based or a remote-based application executed on behalf of the a remote computing machine 186 on a local computing machine 187. In one embodiments the local computing machine 187 may display output to the a remote computing machine 186, in cooperation with the client agent 120, using any thin-client or remote-display protocol, such as the Independent Computing Architecture (ICA) protocol manufactured by Citrix Systems, Inc. of Ft. Lauderdale, Fla. or the Remote Desktop Protocol (RDP) manufactured by the Microsoft Corporation of Redmond, Wash. The application can use any type of protocol such as: a HTTP client, a FTP client, an Oscar client, or a Telnet client. In other embodiments, the application comprises any type of software related to voice-over-IP (VoIP)

communications, such as a soft IP telephone. In further embodiments, the application comprises any application related to real-time data communications, such as applications for streaming video and/or audio. Further, the application can be any type of computer aided design (CAD) application or multimedia application. Typically, CAD and multimedia applications include three dimensional graphics which increase the amount of application data (e.g., output) that is transmitted to the remote computing machine 186 from the local computing machine 187, when the application is executing on the local computing machine 187. As described in more detail below, various components of the network environment cooperate to determine which computing device in the network should be used to render the application output and to determine which mechanism to use to deliver the application output to the remote computing machine 186.

In some embodiments, a local computing machine 187 includes an application delivery system 190 for delivering a computing environment, a desktop or an application and/or data file to one or more remote computing machines 186. The application delivery management system 190 provides application delivery techniques to deliver a computing environment to a desktop of a user, remote or otherwise, based on a plurality of execution methods and based on any authentication and authorization policies applied via a policy engine 195. With these techniques, a remote user may obtain a computing environment and access to server stored applications and data files from any network connected device. In one embodiment, the application delivery system 190 may reside or execute on a local computing machine 187. In another embodiment, the application delivery system 190 may reside or execute on a plurality of servers local computing machines 187. In some embodiments, the application delivery system 190 may execute in a server farm 38. In one embodiment, the local computing machine 187 executing the application delivery system 190 may also store or provide the application and data file. In another embodiment, a first set of one or more local computing machines 187 may execute the application delivery system 190, and a different server local computing machine 187 may store or provide the application and data file. In some embodiments, each of the application delivery system 190, the application, and data file may reside or be located on different servers. In yet another embodiment, any portion of the application delivery system 190 may reside, execute or be stored on or distributed to the appliance 200, or a plurality of appliances.

In one embodiment, a remote computing machine 186 requests execution of an application program and the application delivery system 190 comprising a local computing machine 187 selects a method of executing the application program. In some embodiments, the local computing machine 187 receives credentials from the remote computing machine 186. In another embodiment, the local computing machine 187 receives a request for an enumeration of available applications from the remote computing machine 186. In one embodiment, in response to the request or receipt of credentials, the application delivery system 190 enumerates a plurality of application programs available to the remote computing machine 186. The application delivery system 190 receives a request to execute an enumerated application. The application delivery system 190 selects one of a predetermined number of methods for executing the enumerated application, for example, responsive to a policy of a policy engine. The application delivery system 190 may select a method of execution of the application enabling the remote computing machine 186 to receive application-output data generated by execution of the application program on a server 106. The application delivery system 190 may select a method of execution of the application enabling the remote computing machine 186 to execute the application program locally after retrieving a plurality of application files comprising the application. In yet another embodiment, the application delivery system 190 may select a method of execution of the application to stream the application via the network 104 to the remote computing machine 186.

In some embodiments, the application delivery system 190 comprises any portion of the Citrix Access Suite™ by Citrix Systems, Inc., such as the MetaFrame or Citrix Presentation Server™ and/or any of the Microsoft™ Windows Terminal Services manufactured by the Microsoft Corporation. Also, the delivery system 190 can include Citrix Desktop Server™ (also known as XenDesktop). In one embodiment, the application delivery system 190 may deliver one or more applications to remote computing machines 186 or users via a remote-display protocol or otherwise via remote-based or server-based computing. In another embodiment, the application delivery system 190 may deliver one or more applications to clients or users via streaming of the application.

In one embodiment, the application delivery system 190 includes a policy engine 195 for controlling and managing the access to, selection of application execution methods and the delivery of applications. In some embodiments, the policy engine 195 determines the one or more applications a user or remote computing machine 186 may access. In another embodiment, the policy engine 195 determines how the application should be delivered to the user or remote computing machine 186, e.g., the method of execution. In some embodiments, the application delivery system 190 provides a plurality of delivery techniques from which to select a method of application execution, such as a server based computing, streaming or delivering the application locally to the remote computing machine 186 for local execution.

In another embodiment, the remote computing machine 186 executes a program neighborhood application to communicate with a local computing machine 187 in a farm. In still another embodiment, the local computing machine 187 provides the functionality of a master node. In some embodiments, the remote computing machine 186 communicates with the local computing machine 187 in the farm through a network 104. Over the network 104, the remote computing machine 186 can, for example, request execution of various applications hosted by the local computing machines 187 and receives output of the results of the application execution for display. In some embodiments, only the master node provides the functionality required to identify and provide address information associated with a local computing machine 187 hosting a requested application.

As shown in FIG. 1A, the appliance 200, which also may be referred to as an interface unit 200 or gateway 200, is shown between the networks 104 and 104'. In some embodiments, the appliance 200 may be located on network 104. For example, a branch office of a corporate enterprise may deploy an appliance 200 at the branch office. In other embodiments, the appliance 200 may be located on network 104'. For example, an appliance 200 may be located at a corporate data center. In yet another embodiment, a plurality of appliances 200 may be deployed on network 104. In some embodiments, a plurality of appliances 200 may be deployed on network 104'. In one embodiment, a first appliance 200 communicates with a second appliance 200'. In other embodiments, the appliance 200 could be a part of any remote computing machine 186 or local computing machine 187 on the same or different network 104,104' as the remote computing machine 186. One or more appliances 200 may be located at any point in the network or network communications path between a remote computing machine 186 and a local computing machine 187.

The appliance 200 may accelerate delivery of a computing environment 15, or any portion thereof, to a remote computing machine 186. In one embodiment, the appliance 200 accelerates the delivery of the computing environment 15 by the application delivery system 190. For example, the embodiments described herein may be used to accelerate delivery of a streaming application and a data file processed by the application from a central corporate data center to a remote user location, such as a branch office of the company. In another embodiment, the appliance 200 accelerates transport layer traffic between a remote computing machine 186 and a local computing machine 187. The appliance 200 may provide acceleration techniques for accelerating any transport layer payload from a local computing machine 187 to a remote computing machine 186, such as: 1) transport layer connection pooling, 2) transport layer connection multiplexing, 3) transport control protocol buffering, 4) compression and 5) caching. In some embodiments, the appliance 200 provides load balancing of local computing machines 187 in responding to requests from remote computing machines 186. In other embodiments, the appliance 200 acts as a proxy or access server to provide access to the one or more local computing machines 187. In another embodiment, the appliance 200 provides a secure virtual private network connection from a first network 104 of the remote computing machine 186 to the second network 104' of the local computing machine 187, such as an SSL (Secure Socket Layer) VPN connection. It yet other embodiments, the appliance 200 provides application firewall security, control and management of the connection and communications between a remote computing machine 186 and a local computing machine 187.

Figure 3:
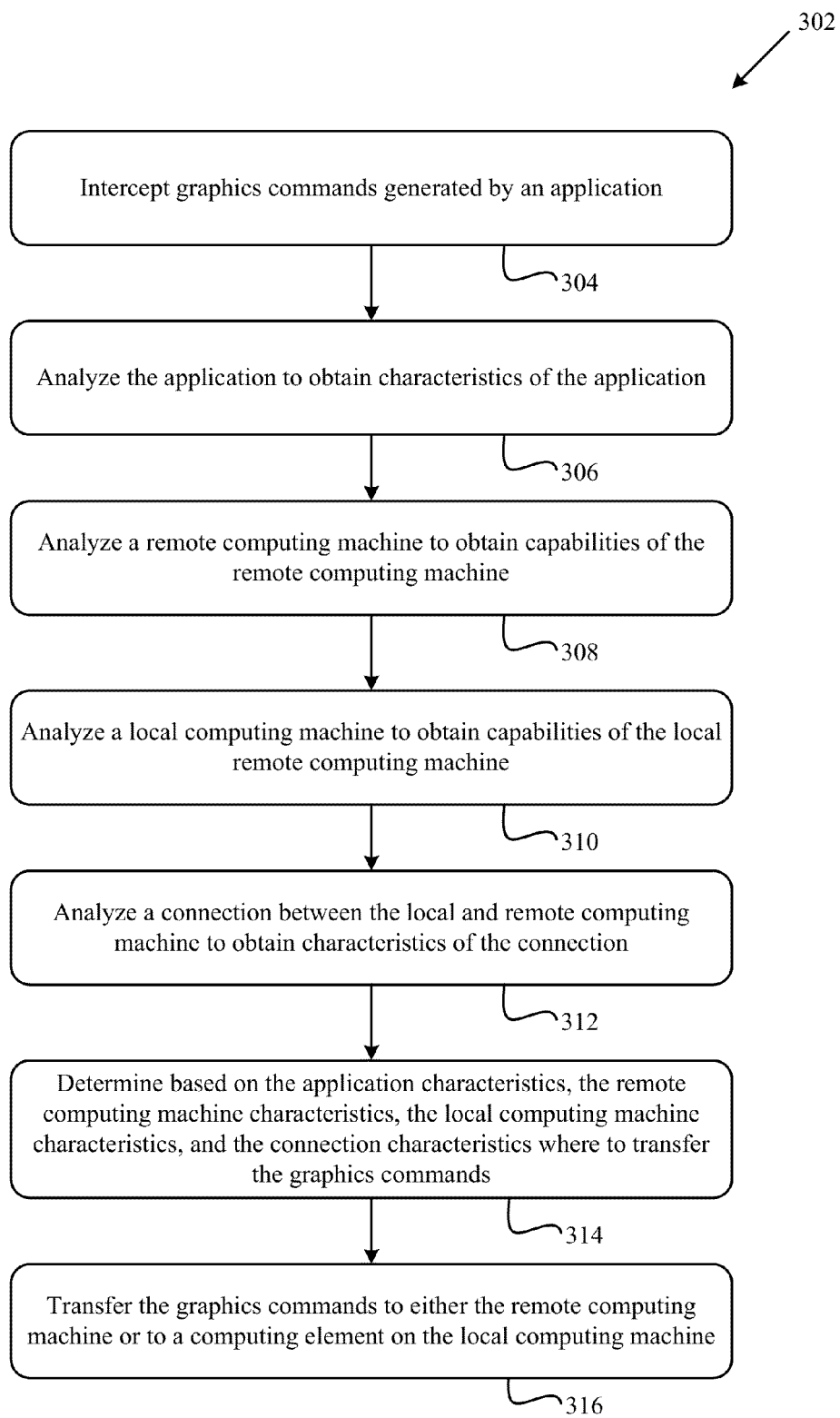
FIG. 3. depicts a flow diagram illustrative of a method for remoting three dimensional graphics.

Illustrated in FIG. 3 is one embodiment of a method 302 for selectively rendering three dimensional graphics. Graphics commands, generated by an application executing on a machine within a distributed computing environment, are intercepted (step 304). In response to the interception of graphics commands, the application is analyzed to determine and obtain characteristics of the application (step 306). A remote computing machine 186 in the distributed computing environment is also analyzed to determine and obtain characteristics of the remote computing machine 186 (step 308). Additionally, a local computing machine 187 in the distributed computing environment is analyzed to determine and obtain characteristics of the local computing machine 187 (step 310). The connection 104 between the local computing machine 187 and the remote computing machine 186 is analyzed to determine and obtain characteristics of the connection 104 (step 312). Once the connection characteristics, the application characteristics, the remote computing machine characteristics and the local computing machine characteristics are obtained, a determination is made as to where to transfer the intercepted graphics commands (step 314). The intercepted graphics commands are transferred to either the remote computing machine 186 or a computing element 265 on the local computing machine 187 (step 316).

Further referring to FIG. 3 and in more detail, in one embodiment, the local computing machine 187 is a server 106 while in another embodiment the local computing machine 187 is a client 102. The remote computing machine 186 can in one embodiment be a client 102 and in another embodiment the remote computing machine 186 can be a server 106. In some embodiments, the local computing machine 187 can be a node or endpoint on a network; and in embodiments where the local computing machine 187 is a server 106, the local computing machine 187 can be a server node or endpoint. In embodiments where the local computing machine 187 is a client 102, the local computing machine 187 can be a client node or endpoint. The remote computing machine 186 can be a client node or endpoint in embodiments where the remote computing machine 186 is a client 102. In embodiments where the remote computing machine 186 is a server 106, the remote computing machine 186 can be a server node or endpoint. The connection between the local computing machine 187 and the remote computing machine 186 can be a network 104, or in some embodiments, more than one network 104, 104'. In other embodiments, the connection can be any form of linking the local computing machine 187 with the remote computing machine 186 so that the local and remote computing machines can communicate with each other.

In one embodiment, graphics commands that are generated by an application are intercepted (step 304). The graphics commands can be three dimensional graphics commands, or any other set of graphics commands that when rendered, require an amount of memory and an amount of processing power greater than the amount of memory and processing power needed to render two-dimensional graphics. In one embodiment, the graphics commands are generated by an application executing on the local computing machine 187. Other embodiments include a method 302 where the graphics commands are generated by an application executing on the remote computing machine 186, while still other embodiments intercept graphics commands that are generated by an application executing on a computing machine or appliance on the network 104, 104'. The graphics commands are intercepted, in one embodiment, by a filter executing on the local computing machine 187. This filter can interface with the application to intercept graphics commands generated by the application. In other embodiments, the filter can be any one of: an application; a filter module; a plug-in; a sub-routine; or any other set of executable commands able to detect the creation of graphics commands by the application and intercept those graphics commands. Still other embodiments include a filter that executes on any one of the following: the local computing machine 187; the remote computing machine 186; an appliance on the network 104; a computing machine on the network 104, where the computing machine is located remotely from the local computing machine 187 and the remote computing machine 186; a virtual machine on the network 104; or any other computing machine able to execute a filter having the above-mentioned capabilities.

The application is analyzed, in one embodiment, to determine a set of characteristics that are specific to the application (step 306). In one embodiment, the filter analyzes the application to determine the application-specific characteristics (step 306). In another embodiment, either the local computing machine 187 or the remote computing machine 186 analyze the application to determine the application-specific characteristics (step 306). Still other embodiments include a third machine or application resident on the network 104 and able to interface with the application to analyze the application and determine the application-specific characteristics (step 306). Analysis of the application can include analyzing a file extension of the application to determine the application type. In some embodiment analysis of the application can include analyzing metadata or a hidden file associated with the application to determine any of: the application type; rules and policies associated with the application; or any other characteristic of the application that provides information that can be used to determine whether three dimensional graphics commands generated by the application should be rendered on the local computing machine 187 or the remote computing machine 186. Still other embodiments includes extracting metadata, a watermark, a tag, an identifier, or other form of identification from the application and mapping that form of identification to a database or rules engine to determine whether three dimensional graphics commands generated by the application should be rendered on the local computing machine 187 or the remote computing machine 186. In one embodiment, the type of application can determine whether to render on the local or the remote computing machine. CATIA is an example where the graphics commands must be rendered on the local computing machine 187. CATIA does not operate in "retain mode" and so continues to send graphics primitives when performing an action as simple as moving an object in a scene. In contrast, applications that can operate in "retain mode" generate much less graphics primitives than an application like CATIA. Accordingly, those applications that operate in "retain mode" may generate graphical commands able to be rendered on a remote computing machine 186. Similarly, the type of object or scene to be rendered can dictate where the rendering occurs. For example, a cub has very few coordinates and can easily be rendered by the remote computing device 186, whereas a three dimensional airplane model has many coordinates and vectors and should likely therefore be rendered by the local computing device 187. Other factors in determining where to render the three dimensional graphical data includes determining the type of graphics used by the application, such as: DirectX, OpenGL, GID, MPEG, Flash, and so on.

The remote computing machine 186 is analyzed, in one embodiment, to determine the capabilities of the remote computing machine 186 (step 308). Analysis of the remote computing machine 186 can be done by any one of the following: the filter; an application executing on the remote computing machine 186; an application executing on the local computing machine 187; the remote computing machine 186; the local computing machine 187; or a third machine or additional application resident on the network 104 and able to interface with the remote computing machine 186 to determine the capabilities of the remote computing machine 186. The analysis of the remote computing machine 186 can be accomplished by interrogating the remote computing machine 186 for information regarding its processing capabilities; and whether the remote computing machine 186 has a computing element able to receive three dimensional graphics commands as input and output three dimensional graphical data. Still other embodiments include analyzing the remote computing machine 186 to determine whether the computing element on the remote computing machine 186 has capabilities sufficient to input the three dimensional graphics commands generated by the application, and output three dimensional graphical data. Other embodiments include analyzing the remote computing machine 186 to determine the availability of the computing element, and to review the overall performance of the remote computing machine 186. This determination can be made by reviewing the performance of the central processing unit; reviewing the performance of a graphical processing unit; reviewing the performance of a bus between the central processing unit and the graphical processing unit; reviewing the performance of a software application having graphics rendering capabilities; identifying the Vista Windows Experience Index (WEI); identifying whether codecs are available on the remote computing machine 186, where the codecs can be either audio/video or just graphical; and the availability of DirectShow or other high level video playback application program interfaces. Available codecs means that the data sent to the remote computing machine 186 can be compressed thus reducing the requirement for available network bandwidth.

The local computing machine 187 is analyzed, in one embodiment, to determine the capabilities of the local computing machine 187 (step 310). Analysis of the local computing machine 187 can be done by any one of the following: the filter; an application executing on the remote computing machine 186; an application executing on the local computing machine 187; the remote computing machine 186; the local computing machine 187; or a third machine or additional application resident on the network 104 and able to interface with the local computing machine 187 to determine the capabilities of the local computing machine 187. The analysis of the local computing machine 187 can be accomplished by interrogating the local computing machine 187 for information regarding its processing capabilities; and whether the local computing machine 187 has a computing element able to receive three dimensional graphics commands as input and output three dimensional graphical data. Still other embodiments include analyzing the local computing machine 187 to determine whether the computing element on the local computing machine 187 has capabilities sufficient to input the three dimensional graphics commands generated by the application, and output three dimensional graphical data. Other embodiments include analyzing the local computing machine 187 to determine the availability of the computing element, and to review the overall performance of the local computing machine 187. This determination can be made by reviewing the performance of the central processing unit; reviewing the performance of a graphical processing unit; reviewing the performance of a bus between the central processing unit and the graphical processing unit; reviewing the performance of a software application having graphics rendering capabilities; identifying the Vista Windows Experience Index (WEI); identifying whether codecs are available on the local computing machine 187, where the codecs can be either audio/video or just graphical; and the availability of DirectShow or other high level video playback application program interfaces. Available codecs means that the data sent to the local computing machine 187 can be compressed thus reducing the requirement for available network bandwidth.

The connection between the local computing machine 187 and the remote computing machine 186 is analyzed to obtain characteristics of the connection (step 312). In one embodiment, analyzing the connection includes determining values representative of performance parameters of the connection, such as a value of the available bandwidth on the connection, a value representative of connection latency, or a value representative of the likelihood of bottlenecks. These values can be determined in real-time, historically, or as a time-averaged determination. Analysis of the connection can also include determining a value representative of the physical distance between the remote computing machine and the local computing machine, a determination of the type of transport protocol to be used to transmit either the graphics commands or the graphical data, or a determination of the connection medium (e.g. cable, fiber, wireless.)

A determination as to where to render the three dimensional graphical data is made based on the application characteristics, the local computing machine capabilities, the remote computing machine capabilities, and the connection characteristics (step 314). Each of the obtained characteristics and capabilities are weight and a choice is made as to the optimal location for rendering. In one embodiment, a policy engine can be used to further enforce rules associated with the system, and in some embodiments, associated with the obtained characteristics and capabilities. In still other embodiments, the obtained capabilities and characteristics may not be used to determine where to render, but rather, the decision where to render may be based entirely on an enforced policy or rule.

Once rendered, the graphics commands are transferred to the determined location. If it is determined that the local computing machine 187 will render the graphical data, then the graphics commands are transferred to a computing element on the local computing machine 187. The computing element receives the graphics commands as input, renders graphical data from the graphics commands, and outputs graphical data. The graphical data is then transferred to the remote computing machine 186 where it can either be displayed or stored. If it is determined that the remote computing machine 186 will render the graphical data, then the graphics commands are transferred to the remote computing machine 186. A computing element on the remote computing machine 186 receives the graphics commands as input, renders graphical data from the graphics commands, and outputs graphical data. The remote computing machine 186 can then store or display the graphical data. In one embodiment, the local computing machine 187 stores the graphics commands prior to determining where to render the graphical data.

In one exemplary embodiment, the selection of where three dimensional graphical data is rendered from the three dimensional graphics commands, can change based on the system configuration. Thus, rendering three dimensional graphical data is dynamic because it can be rendered by the local computing machine 187, the remote computing machine 186, any computing element on either the local or remote computing machines 187, 186, or any other computing element or machine able to render three dimensional graphical data from the three dimensional graphics commands. A determination of where to render can be made based on any of the following: a user session; a session; a user; a periodic scan of the system; a detected change in the system; a request generated by the application; on interception of three dimensional graphics commands; or in response to any other event or time period. In some embodiments, a portion of the three dimensional graphics commands can be rendered in one location while the other portion of the three dimensional graphics commands can be rendered in another location. Selection of which portion to render where can be based on: whether the graphics commands relate to background or foreground graphics; whether the commands relate to texture mapping or vector drawing; whether there is a particular pattern within the graphics commands.

Figure 4:
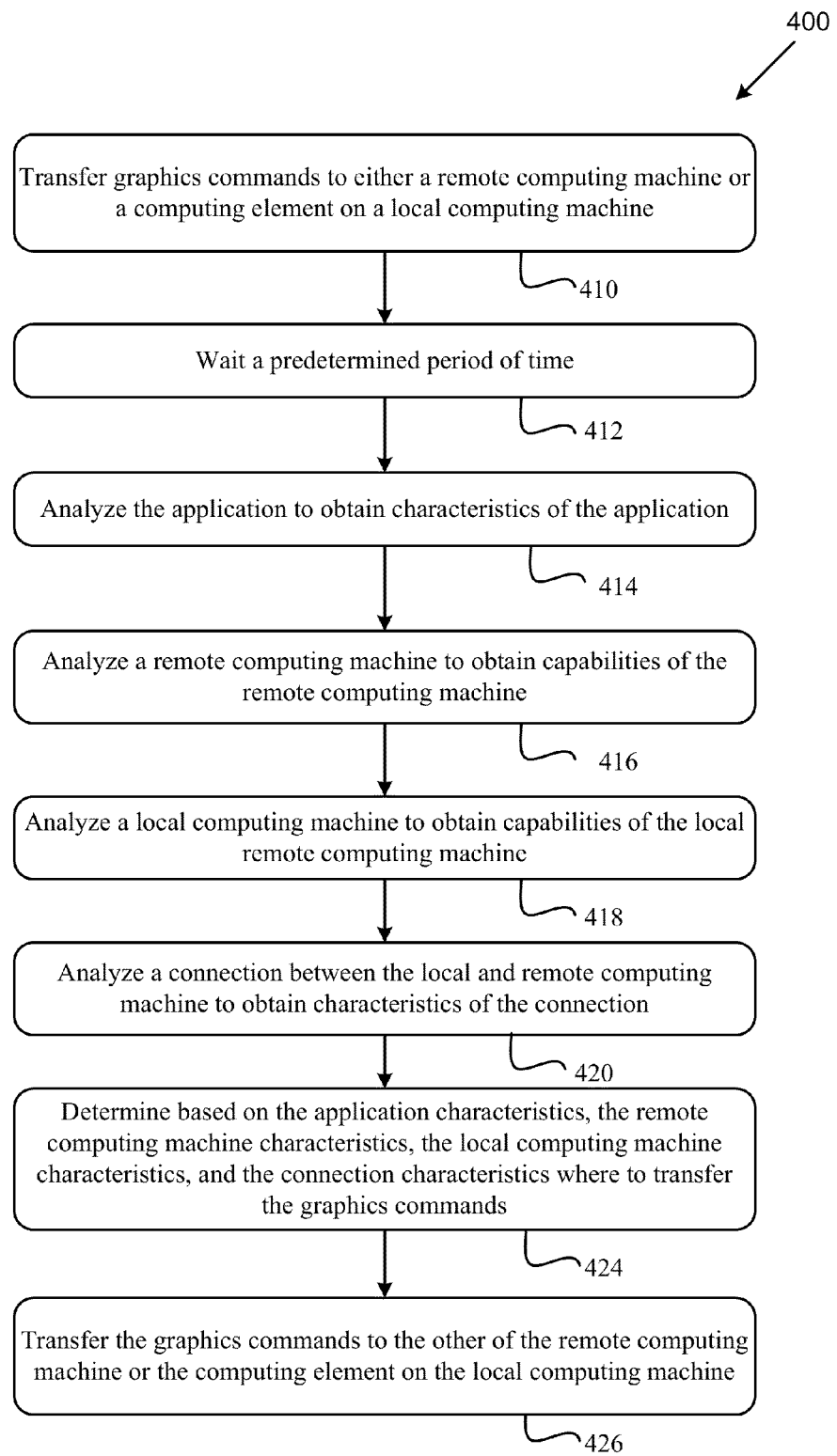
FIG. 4 depicts a flow diagram illustrative of a method for remoting three dimensional graphics.

Illustrated in FIG. 4 is a method 400 for selectively rendering three dimensional graphics. After graphics commands have been transferred to either a remote computing machine 186 or a computing element on a local computing machine 187 (step 410), the application or client agent 120 waits a predetermined period of time (412). This tie can be specified either in client agent 120 or by the user. After waiting the predetermined period of time, the application is analyzed to determine and obtain characteristics of the application (step 414). A remote computing machine 186 in the distributed computing environment is also analyzed to determine and obtain characteristics of the remote computing machine 186 (step 416). Additionally, a local computing machine 187 in the distributed computing environment is analyzed to determine and obtain characteristics of the local computing machine 187 (step 418). The connection 104 between the local computing machine 187 and the remote computing machine 186 is analyzed to determine and obtain characteristics of the connection 104 (step 420). Once the connection characteristics, the application characteristics, the remote computing machine characteristics and the local computing machine characteristics are obtained, a determination is made as to where to transfer the intercepted graphics commands (step 424). The intercepted graphics commands are transferred to the other of either the remote computing machine 186 or a computing element 265 on the local computing machine 187 (step 426).

Further referring to FIG. 4 and in more detail, an example of the method 400 includes an application executing on a local computing machine 187 and producing three dimensional graphics commands. After obtaining and reviewing the application characteristics, the local computing machine 187 capabilities, the remote computing machine 186 capabilities and the connection characteristics; it is determined that the graphics commands will be transferred to the computing element on the local computing machine 187. After a predetermined period of time, the application characteristics, the local computing machine 187 capabilities, the remote computing machine 186 capabilities and the connection characteristics are re-obtained and reviewed. Upon review of the characteristics and capabilities, a determination is made that the graphics commands will now be transferred to the remote computing machine 186 where they will be used to render graphical data. In another embodiment, the graphics commands may be sent to the remote computing machine 186 first and then sent to the computing element on the local computing machine 187 after a review of the re-obtained characteristics and capabilities.

In Windows Vista, a DirectX application sends graphics to a Direct3D runtime which cooperates with a user mode driver and a graphics kernel to render the DirectX graphics commands on available hardware. When a DirectX application executes in Terminal Services, there is a degradation in the execution of the DirectX application and the generation of enhanced graphics. One cause of the degradation in performance is that the application, when executing in Terminal Services, no longer has access to graphics rendering hardware such as a graphics processing unit. Thus, the DirectX application relies on software, executing in the Direct3D runtime and kernel, to render the DirectX graphics commands into graphical data. Loss of access to graphics rendering hardware therefore degrades the performance of the DirectX application.

Figure 5:
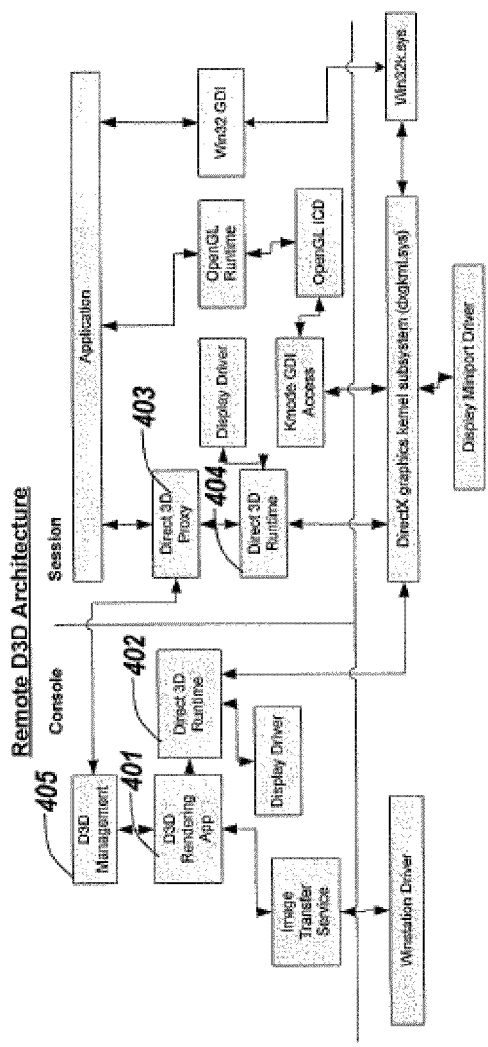
FIG. 5 depicts a block diagram of an embodiment of a system for remoting Direct3D graphics.

Illustrated in FIG. 5 is an embodiment of a system that alleviates the troubles associated with executing a DirectX application in terminal services, as described above. Included in this system is a Direct3D rendering application 401 in communication with a Direct3D runtime module 402. A Direct3D proxy 403 is included and is in communication with a Direct3D runtime 404 and a Direct 3D management service 405.

Further referring to FIG. 5 and in more detail, described is a system that permits DirectX applications executing in terminal services to use the graphics hardware on the server as opposed to software executing in the Direct3D runtime 404. The system can in some embodiments focus on the use of DirectX and Windows Presentation Foundation applications. The Direct3D rendering application 401 transmits commands to the Direct3D runtime module 402. The Direct3D rendering application 401 acts as a proxy for the application in the session by receiving commands forwarded from the Direct3D Proxy module 403.

In operation, as an application attempts to drive the Direct3D system to render a scene, the Direct3D Proxy 403 reroutes its graphics commands to the Direct3D Rendering Application 401, which, in turn, sends these commands to its Direct3D runtime 402 as if it were the requesting application. In essences, the present architecture expected by the application is transparent. Further, the Direct3D proxy 403 allows the application to operate just like it normal would when communicating with the Direct3D runtime 404 in the session space.

In one embodiment, the Direct3D Proxy 403 intercepts Direct3D calls and routes them to the Direct3D Rendering Application 401 running in the console session. Also, the Direct3D Proxy 403 initiates communication between itself and the Direct3D management service 405 that in turn creates the rendering application service. In some embodiment, the Direct3D proxy 403 hooks the real runtime but only affect graphics calls which would have been handled by the display driver.

In one embodiment, the Direct3D Management service 405 creates the Direct3D Rendering Application 401 and establishes a communication path between the Direct3D Rendering Application 401 and the Direct3D Proxy 403 which requested server hardware support.

In summary, the embodiment of the architecture described above with reference to FIG. 5 provides access to graphics hardware of the server 106 (e.g., a GPU or GPU appliance 250) in a terminal service session. As a result, the remoting of a bitmapped rendered graphics to the remote computing machine 186 is improved related to rendering the bitmaps in software.

In another embodiment, assume the Direct3D application is a "desktop" such as the AERO desktop provided by WINDOWS Vista and the remote computing machine 186 is accessing a remote desktop on the local computing machine 187. In some embodiments, the client's 102 GPU 121 is used to render either the OPEN GL or Direct3D scenes. In one aspect, the transmission of the graphics information from the local computing machine 187 to the remote computing machine 186 is improved relative to other scenarios.

Figure 6:
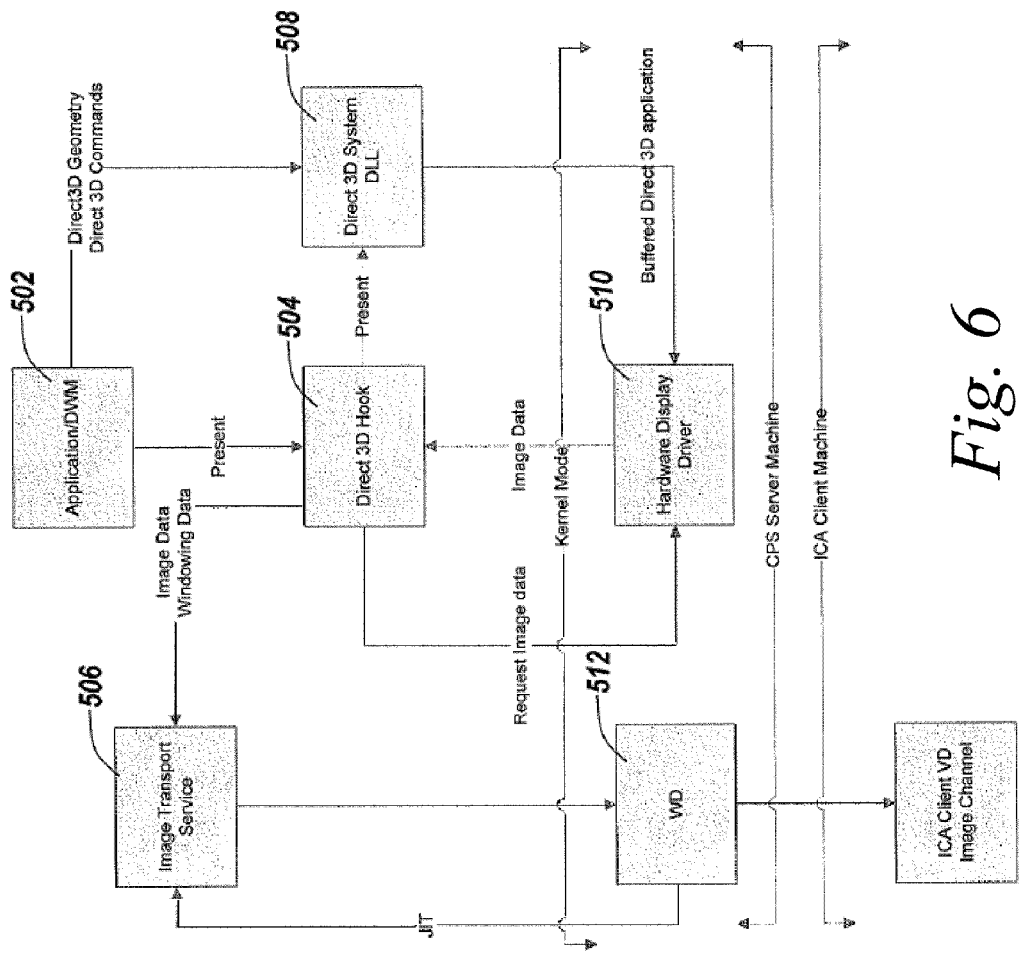
FIG. 6 depicts a block diagram of an embodiment of a system for remoting three dimensional graphics.

With reference to FIG. 6, a diagram shows one embodiment of an architecture that outlines the components and data flow between the components. In this architecture the layering between the display driver and application is thin to limit the overhead and development effort.

In one embodiment, the architecture includes an Application/Desktop Windows Manager (DWM) module 502. In one embodiment, the Desktop Windows Manager is a WPF application that acts at the window manager. The Desktop Windows Manager interacts with the D3D9Ex interface. The Desktop Windows Manager is responsible for rendering the non-client portion of the windows and the transition effects that affect the windows. In one embodiment, the Application/Desktop Windows Manager module 502 is provided by the system or application that used direct 3D. The Desktop Windows Manager uses Direct3D to create a desktop. This component will be the component that provides the 3D geometry to render the scene. In some aspects, the Application/Desktop Windows Manager module 502 drives the Direct3D system to render the scene. In such embodiments, the Application/Desktop Windows Manager module 502 has no specific function, but rather is the source of the three dimensional geometry.

The architecture also includes a Direct3D Hook module 504. In one embodiment, the Direct3D hook module 504 provides the functionality necessary to detect screen updates by intercepting a Present call that causes the back buffer to be switched with the front buffer. Once the hook detects the Present call, the hook should pass that call through and collect the window information for the application and the image data from the graphics card. The hook then presents both the image data and window information to the Image Transport service 506.

In some embodiments, the Direct3D Hook module 504 provides functionality related to: detecting screen updates; hooking the Direct3D data to detect screen updates; presenting the Image Transport Service 506 with data such as image data from the graphics card and information for the context. Also, the Direct3D Hook module 504 provides a reliable hooking environment with limited overhead. The image collection collects portions of the screen that are being updated through the Present call.

The architecture includes a Direct3D System module 508. In one embodiment, the Direct3D system module is a dynamic link library (dll). The Direct3D System module 508 provides functionality related to buffering of commands and geometry data to be sent to a hardware display driver 510. In some embodiments, the Direct3D System module 508 packages the Direct3D calls into buffers for bulk transfer. The architecture can also include the Hardware Display Driver 510. This driver is an existing hardware driver. Its role is to operate in the normal manor, and allow the Direct3D hook module 504 to collect image data off the graphics card. The Hardware Display Driver 510 also renders the scene into a bitmap and delivers the image to the Direct3D Hook module 504.

The architecture can also include an Image Transport Service module 506. This module communicates with the Direct3D Hook module and 504 and the Winstation Driver 512. This component includes functionality for an image transport virtual channel that delivers images to the client 102. In various embodiments, the Image Transport Service module 506 implements one or more compression schemes (e.g., aggressive compression). As used herein, aggressive compression refers to lowering the quality of images during animation routines to allow more through put at the cost of image quality. This process is thought to improve frame refresh rates by reducing the level of detail in the image during animation. The final frame of the animation is detected and sent at a higher quality.

In various embodiments, the Image Transport Service module 506 requests the image from the Direct3D hook module 504, implementing aggressive compression, caching, and implementing a new image virtual channel. Further the Image Transport Service module 506 receives Window notifications. Additionally, the Image Transport Service module 506 aides in managing the network traffic to achieve maximum frame rates.

The architecture also includes a WINSTATION DRIVER module 512. In some embodiments, the WINSTATION DRIVER module 512 aides in implementing the virtual channel multiplexing to a single connection. This includes the implementation of optimizations for network traffic and virtual channel priorities queues.

In further detail, Direct3D has two available interfaces for collecting this information. The first is the user mode WDDM interface and the second is the Direct3D SDK interface. With regard to the user mode WDDM, one method of detecting screen updates is through the Present function call. This function causes the back buffer of the D3D context to be copied into the front buffer of the screen. The windowing information can be provided in the Present call or could be missing. Regarding the Direct3D SDK interface, this interface is a COM object interface. The Present call can be made from many different interfaces. These include IDirect3DDevice9, IDirect3DSwapChain9 and IDXGISwapChain. Both IDirect3DDevice9 and IDirect3DSwapChain9 are interface on Direct3D 9 while the IDXGISwapChain is for Direct3D 10.

Figure 7:
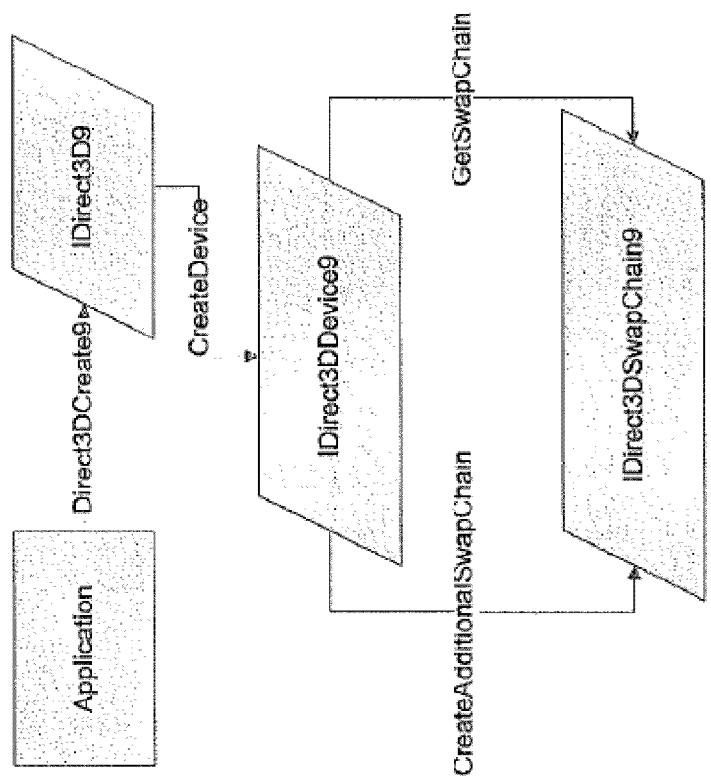
FIG. 7 depicts a block diagram of an embodiment of a method for Direct3D COM object creation or Access flow.

With reference to FIG. 7, a Direct3D COM Object Creation or Access flow is shown and described. The IDirect3DSwapChain9 object is created or obtainable through the IDirect3DDevice9::CreateAdditionalSwapChain or IDirect3DDevice9::GetSwapChain interface functions. The IDirect3DDevice9 object is obtained by calling the IDirect3D9::CreateDevice function. The IDirect3D9 interface is accessible from an object returned by Direct3DCreate9. Unlike other system COM object Direct3D COM objects are not created with the CoCreateInstance. Instead the first COM object is created with the Direct3DCreate9 API. Then from there the other Direct3D COM objects are return from function call on the COM objects.

Figure 8:
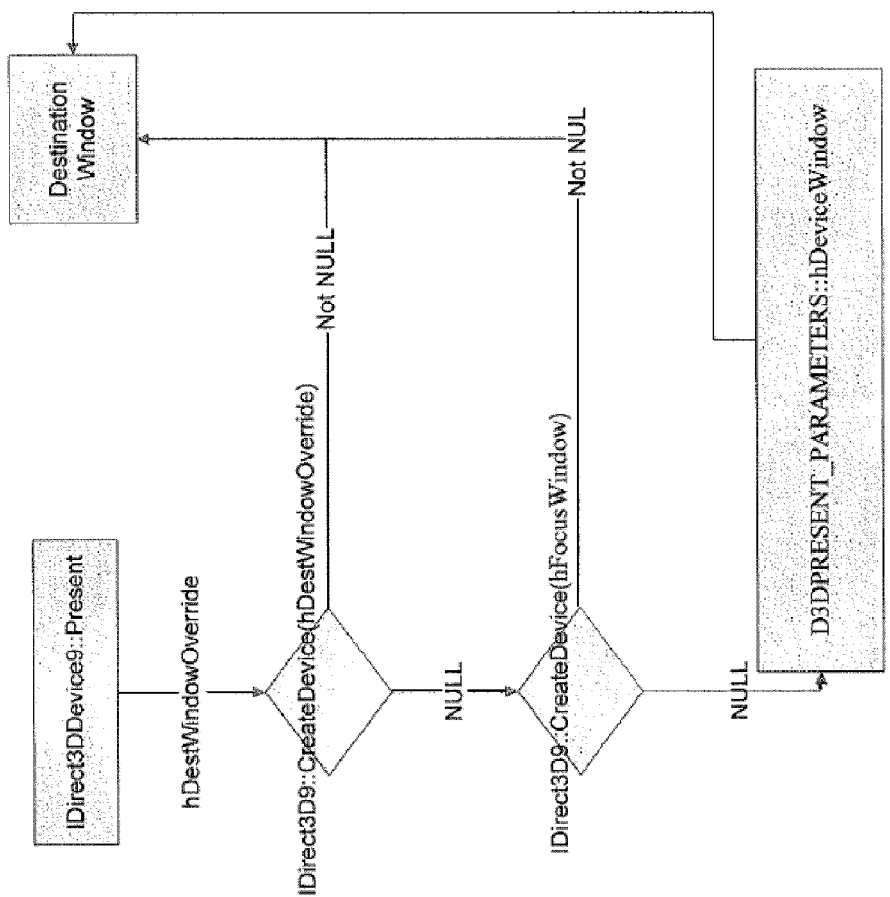
FIG. 8 depicts a block diagram of an embodiment of a method for operating a destination window determination mechanism.

With reference to FIG. 8, the operation of a destination window determination mechanism is shown and described. The windowing information can be included in the Present call with the hDestWindowOverride. If this parameter is not supplied then the window is retrieved from the D3DPRESENT_PARAMETERS structure assigned to either the IDirectSwapBufferChain9 or IDirect3DDevice9 Object. The IDirect3DDevice9 object allows setting up the destination window on the IDirect3D9::CreateDevice with either the hFocusWindow or the hDeviceWindow of the D3DPRESENT_PARAMETERS structure. In addition to IDirect3D9::CreateDevice the IDirect3DDevice9::Reset allows you to set the hDeviceWindow of the D3DPRESENT_PARAMETERS associated with the Direct3D context. The IDirect3DSwapChain9 object only has one mechanism of setting the hDeviceWindow of the D3DPRESENT_PARAMETERS on the IDirect3DDevice9::CreateAdditionalSwapChain.

In some embodiments of the above-described architecture, the Present calls are monitored along with the window destination information. This information can be achieved through hooking the Direct3D SDK interface. This interface includes a normal API function called from the Application through dynamic linking or static linking to the Direct3D Dynamic Library. This function call is Direct3DCreate9 and is responsible for creating a COM object.

From this point on the hooking leverages a different COM interface hooking technique. This technique will allow for the information provided by the application to be collected and leveraged as necessary to collect the Windowing information and screen updates.

In one embodiment, the Direct3DCreate9 interface leverages the standard Hooking mechanism that the ICA Server currently uses to support capturing information at the Application level. This mechanism will allow us to insert COM hooking on the necessary COM objects.

In another embodiment, the previously discussed COM function collects the widowing information and knowledge about when screen updates are available. The COM object hooking is concerned with information coming from the application into the Direct3D runtime through the COM interface.

In another embodiment, a pass-thru COM object is implemented. This pass-thru COM object ensures that the Interface calls from application result in a call to the real Direct3D COM object. In order to do this substantially all creation call or access call to the Interfaces in question are hooked. Instead of returning back the Direct3D COM object a pass-thru COM object is returned. Further, the pass-thru COM object creates a Direct3D COM object and passes the interface calls through to the Original COM object.

In one embodiment, COM implements reference counting in order to free up objects that no longer have references. The COM pass-thru mechanism does not need to be concerned with leaving hooked COM objects dangling. It is valid for the hooked COM object to have a higher reference count than the pass-thru COM object reference count. This is because it is possible for the create calls to increase the reference count for the object creating the reference. This can be achieved even though the Direct3D COM objects make direct calls to other Direct3D COM objects. The pass-thru COM implementation will correctly keep the reference to the COM objects and their usage.

Figure 9:
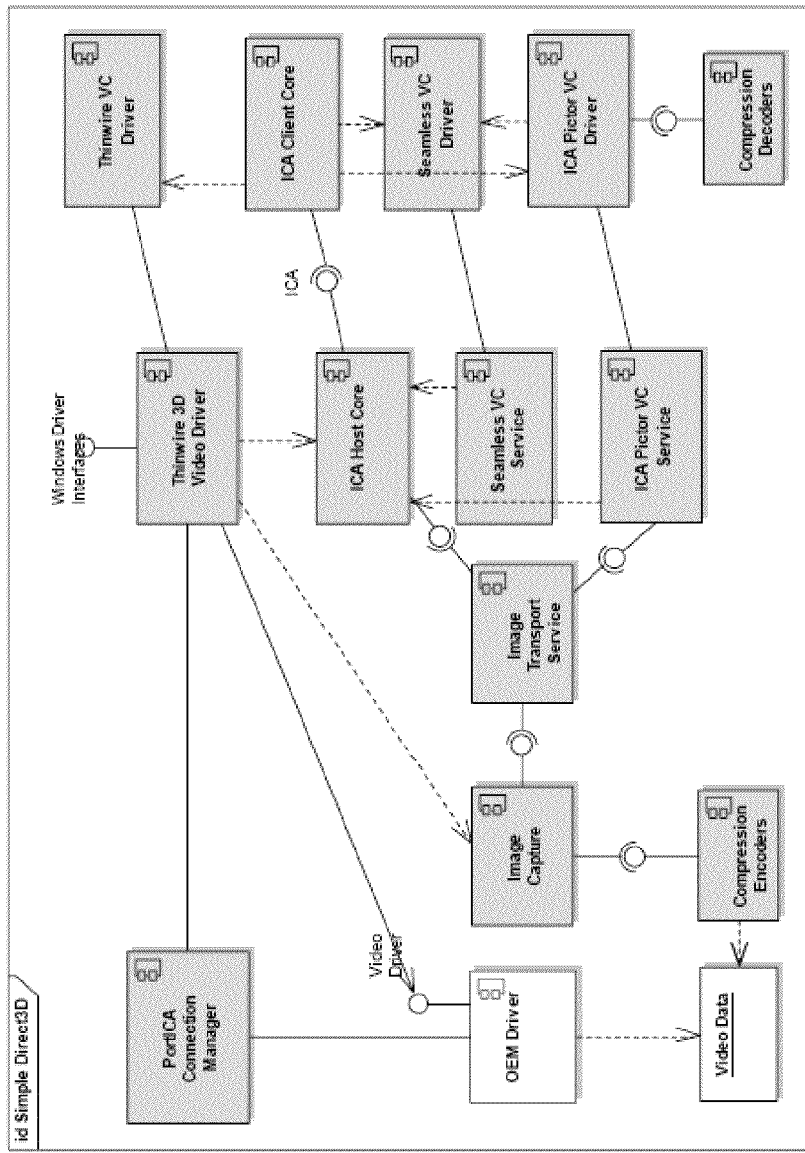
FIG. 9 depicts a block diagram of an embodiment of an architecture for remoting three dimensional graphics.

Illustrated in FIG. 9 is one embodiment of an architecture for accomplishing hardware rendering of three dimensional or other enhanced graphics. The components within this architecture are the portICA connection manager, the passthru video display driver and/or DirectX hooks, the Image Capture Model, compression encoders and decoders, image transport service, and the pictor virtual channel.

Referring to FIG. 9 and in more detail, the portICA connection manager determines the type of connection being made between a remote computing machine and a local computing machine, and configures the correct video display to use. This configuration is based in part on a determination as to whether a video driver is installed in either the local computing machine or the remote computing machine, and what type of video driver is installed in the local computing machine and the remote computing machine. This connection manager can refer to a component included within the architecture to determine the correct ICA stack to use. The requirements considered when determining the correct ICA stack to use are: the type of connection and the hose operating systems.

In one embodiment, the video driver for a session is a driver that can chain device driver commands to the actual OEM video driver used to render graphics on the hardware. This video driver allows other components and applications to hook above the video driver so that those components and applications obtain higher level DirectX commands or other data relevant to either remotely connect to the client, or to obtain remote three-dimensional graphics from the client and/or server. In one embodiment, the image capture module is used to provide an interface to obtain display data in the optimal compressed format. Some embodiments include a video driver that allows the portICA connection manager to enable and disable the video driver as required. Still other embodiments include a video driver that can renegotiate capabilities, such as compression modes, when the video driver is enabled.

The Image Capture Module, in one embodiment, provides the interface to the Image Transport Service to collect images for transmission to the client. The Capture Module can interface and operate with the video driver to identify the screen updates that need to be delivered to the client or server. The Image Capture Module requires an interface so that the Image Capture Module can notify the Transport Service when new image data (i.e. a dirty bit) is created, and to notify the Transport Server about methods available to extract image data in a format appropriate for transmission over the available bandwidth and resources. The Image Capture Module may also include window information such as the window coordinate, the window handles, or other window information that can aid in the creation of seamless connections. Performance technologies related to using compression or caching may affect how the Image Capture Module can be used.

The compression encoder and decoder modules support the various types of compression used by the systems and methods described herein. Each compression type has associated with it a host and client module. In some embodiments, compression modules on the host are located within the Image Capture Module and close to the hardware rendering components so as to enable the GPU to be used during compression. In one embodiment, the GPU is not required to support compression, but the availability is desired. In other embodiments, compression modules on the client are close to the rendering component because the client GPU can be used decompress and render at the same time on a graphics card. In some embodiments, the client may support compression and caching techniques that are not performed by the GPU on the server, in these embodiments, the decoder on the client may require a client side driver if hardware decompression technology is used.

In one embodiment, the Image Transport Service is responsible for packetizing the images for transport over the ICA protocol and is responsible for managing the bandwidth consumed by the image transfer protocol. The Image Transport Service can, in some embodiments, provide service to all sessions running within the operating system of the server. Further, the Image Transport Service can respond to signals from the image capture module about the availability of image data and can further monitor the ICA traffic to determine when to send graphic data through the Pictor virtual channel. The Image Transport Service can negotiate the client capabilities with the ICA client.

In one embodiment, the Pictor virtual channel is an image transfer protocol with rendering commands. The Pictor protocol can include multiple compression mechanisms that include the appropriate negotiation of client and host capabilities. The negotiation of compression mechanisms can enable arbitrary types of compression to be used by the server and client. In one embodiment, the Pictor virtual driver in the ICA client can decompress and render images where appropriate on the screen.

Figure 10:
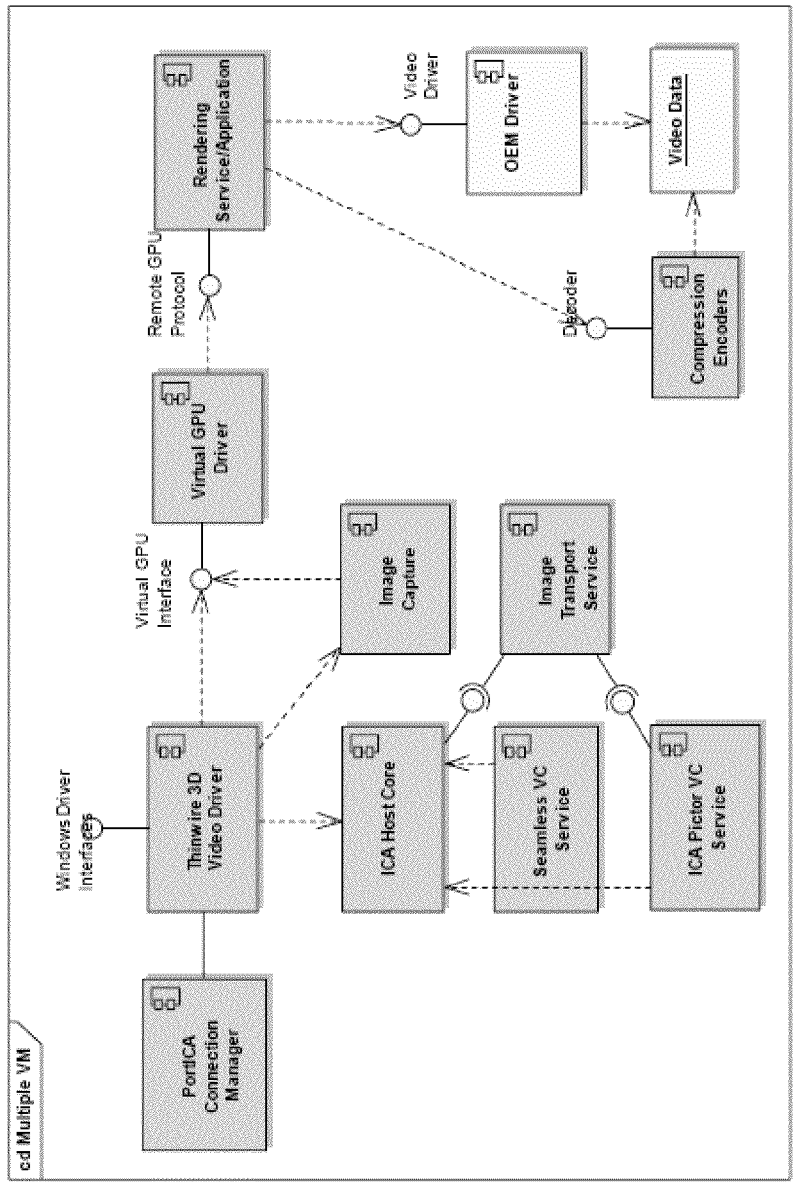
FIG. 10 depicts a block diagram of an embodiment of an architecture for remoting three dimensional graphics.

Illustrated in FIG. 10 is an embodiment of a multiple virtual machine architecture. This architecture includes a GPU that is shared amongst virtual machines, and a network based appliance. Further included is a virtual graphical processing unit (GPU) driver and a rendering application.

The virtual GPU driver, in one embodiment, operates within a CDS session and uses either an inter-virtual machine communication protocol, or a network protocol that is able to communicate with a rendering application or service that manages physical hardware able to perform graphics rendering, image capture and image compression. Some embodiments include a virtual GPU that allows multiple virtual machines in a single environment to access and share the physical GPU and any additional compression hardware in the environment, by communicating graphics primitives to a service that leverages physical display adapters and compression hardware to render graphics for multiple user sessions.

A rendering application can, in one embodiment, also be a rendering service that provides GPU sharing services to multiple clients operating in different virtual machines through a network or shared memory protocol. In some aspects, the rendering application or service can leverage one or many GPUs, compression hardware components, or other graphical processing hardware components to provide one or many virtual machines with the resources necessary to render, capture images and compress images. Still further aspects include a rendering application or service that provides clients or servers with required compression applications or hardware.

What is claimed is:

1. A method for remoting three dimensional graphical data, the method comprising:
    intercepting, by a local computing machine in a distributed computing system, three dimensional graphics commands generated in a session by an application executing on the local computing machine prior to the processing of the three dimensional graphics commands by a display driver executing on the local computing machine;
    obtaining application specific characteristics of the application by analyzing the application;
    obtaining capabilities of a remote computing machine in the distributed computing system by analyzing the remote computing machine;
    obtaining capabilities of the local computing machine by analyzing the local computing machine;
    obtaining characteristics of a connection installed between the local computing machine and the remote computing machine by analyzing the connection;
    determining, based on the application characteristics, the remote computing machine capabilities, the local computing machine capabilities, and the connection characteristics, to which one of the remote computing machine and a computing element on the local machine that receives as input three dimensional graphics commands to transfer the intercepted three dimensional graphics commands;
    transferring the three dimensional graphics commands to one of the remote computing machine and the computing element on the local computing machine responsive to determining where to transfer the intercepted three dimensional graphics commands;
    waiting a predetermined period of time within the session;
    re-obtaining each of the application specific characteristics, the remote computing machine capabilities, the local computing machine capabilities, and the connection characteristics; and
    re-determining, based on the application characteristics, the remote computing machine capabilities, the local computing machine capabilities, and the connection characteristics, to which of the remote computing machine and the computing element on the local machine to transfer the intercepted three dimensional graphics commands; and
    transferring the three dimensional graphics commands to one of the remote computing machine and the computing element on the local computing machine responsive to re-determining where to transfer the intercepted three dimensional graphics commands.

2. The method of claim 1, wherein intercepting three dimensional graphics commands further comprises intercepting primitive three dimensional graphics commands.

3. The method of claim 1, wherein intercepting three dimensional graphics commands further comprises intercepting high level three dimensional graphics commands.

4. The method of claim 1, wherein analyzing the remote computing machine further comprises determining whether the remote computing machine has a computing element having the capability to receive three dimensional graphics commands and output three dimensional graphical data.

5. The method of claim 1, wherein analyzing the remote computing machine further comprises determining a score associated with the remote computing machine, the score associated with a hardware and software configuration of the remote computing machine.

6. The method of claim 1, wherein analyzing the remote computing machine further comprises identifying codecs available on the remote computing machine.

7. The method of claim 1, wherein analyzing the local computing machine further comprises determining whether the local computing machine has a computing element having the capability to receive three dimensional graphics commands and output three dimensional graphical data.

8. The method of claim 1, wherein analyzing the connection further comprises determining an amount of bandwidth available in the connection.

9. The method of claim 1, wherein transferring further comprises transferring three dimensional graphics commands to the computing element on the local computing machine.

10. The method of claim 9, further comprising:
rendering, by the computing element, three dimensional graphical data from the three dimensional graphics commands; and
transmitting, by the local computing machine, the rendered three dimensional graphical data to the remote computing machine.

11. The method of claim 9, wherein transferring to a computing element on the local computing machine further comprises transferring to a graphics engine on the local computing machine.

12. The method of claim 9, wherein transferring to a computing element on the local computing machine further comprises transferring to a processor on the local computing machine, the processor having the capability to receive three dimensional graphics commands and output three dimensional graphical data.

13. The method of claim 9, wherein transferring to a computing element on the local computing machine further comprises transferring to an application executing on the local computing machine, the application receiving three dimensional graphics commands and outputting three dimensional graphical data.

14. The method of claim 10, further comprising:
receiving, by the remote computing machine, the three dimensional graphical data; and displaying, by the remote computing machine, the received three dimensional graphical data.

15. The method of claim 1, wherein transferring further comprises transferring three dimensional graphics commands to the remote computing machine having a computing element.

16. The method of claim 15, further comprising:
receiving, by the computing element, the three dimensional graphics commands; and
outputting, by the computing element, three dimensional graphical data.

17. The method of claim 15, wherein transferring to a computing element on the remote computing machine further comprises transferring to a graphics engine on the remote computing machine.

18. The method of claim 15, wherein transferring to a computing element on the remote computing machine further comprises transferring to a processor on the remote computing machine, the processor having the capability to receive three dimensional graphics commands and output three dimensional graphical data.

19. The method of claim 15, wherein transferring to a computing element on the remote computing machine further comprises transferring to an application executing on the remote computing machine, the application receiving three dimensional graphics commands and outputting three dimensional graphical data.

20. The method of claim 15 further comprising displaying, by the remote computing machine, the outputted three dimensional graphical data.

21. The method of claim 1 further comprising storing the three dimensional graphics commands prior to transmission.

22. The method of claim 1, wherein transferring further comprises transferring three dimensional graphics commands to the computing element on the local computing machine, the computing element comprising a computer hardware element capable of rendering three dimensional graphical data from graphics commands.

23. The method of claim 1, wherein transferring further comprises transferring three dimensional graphics commands to the remote computing machine having a computing element, the computing element comprising a computer hardware element capable of rendering three dimensional graphical data from graphics commands.

24. The method of claim 1, wherein the local computing machine is a mobile device.

25. A system for remoting three dimensional graphical data, the system comprising:
a remote computing machine within a distributed computing system;
a connection installed between the remote computing machine and a local computing machine within the distributed computing system, the remote computing machine communicating with the local computing machine via the connection;
an application executing within a session on the local computing machine, the application generating three dimensional graphics commands; and
the local computing machine having a computing element that receives as input three dimensional graphics commands and outputs three dimensional graphical data, the local computing machine executing an application to:
intercept the three dimensional graphics commands prior to the processing of the three dimensional graphics commands by a display driver executing on the local computing machine,
analyze the application to obtain application specific characteristics of the application,
analyze the remote computing machine to obtain capabilities of the remote computing machine, analyze the local computing machine to obtain capabilities of the local computing machine,
analyze the connection to obtain characteristics of the connection,
determine, based on the application characteristics, the remote computing machine capabilities, the local computing machine capabilities, and the connection characteristics, to transfer the intercepted three dimensional graphics commands to one of the remote computing machine and the computing element on the local computing machine; and
transfer the three dimensional graphics commands to one of the remote computing machine and the computing element on the local computing machine responsive to determining where to transfer the intercepted three dimensional graphics commands;

wait a predetermined period of time within the session;

re-obtain each of the application specific characteristics, the remote computing machine capabilities, the local computing machine capabilities, and the connection characteristics;

re-determine, based on the application characteristics, the remote computing machine capabilities, the local computing machine capabilities, and the connection characteristics, to which of the remote computing machine and the computing element on the local machine to transfer the intercepted three dimensional graphics commands; and transfer the three dimensional graphics commands to one of the remote computing machine and the computing element on the local computing machine responsive to re-determining where to transfer the intercepted three dimensional graphics commands.

26. The system of claim 25, wherein the local computing machine intercepts high level three dimensional graphics commands.

27. The system of claim 25, wherein the local computing machine intercepts primitive three dimensional graphics commands.

28. The system of claim 25, wherein the local computing machine analyzes the remote computing machine by determining whether the remote computing machine has a computing element capable to receive three dimensional graphics commands and output three dimensional graphical data.

29. The system of claim 25, wherein the local computing machine analyzes the remote computing machine by determining a score associated with the remote computing machine, the score associated with a hardware and software configuration of the remote computing machine.

30. The system of claim 25, wherein the local computing machine analyzes the remote computing machine by identifying codecs available on the remote computing machine.

31. The system of claim 25, wherein the local computing machine analyzes the local computing machine to determine whether the computing element on the local computing machine has the capability to receive three dimensional graphics commands and output three dimensional graphical data.

32. The system of claim 25, wherein the local computing machine analyzes the connection to determine an amount of bandwidth available in the connection.

33. The system of claim 25, wherein transferring further comprises transferring three dimensional graphics commands to the computing element on the local computing machine.

34. The system of claim 33, further comprising:
the computing element on the local computing machine, rendering three dimensional graphical data from the three dimensional graphics commands; and
the local computing machine transmitting the rendered three dimensional graphical data to the remote computing machine.

35. The system of claim 33, further comprising the local computing machine transferring to a graphics engine on the local computing machine.

36. The system of claim 33, further comprising the local computing machine transferring to a processor on the local computing machine, the processor having the capability to receive three dimensional graphics commands and output three dimensional graphical data.

37. The system of claim 33, further comprising the local computing machine transferring to an application executing on the local computing machine, the application receiving three dimensional graphics commands and outputting three dimensional graphical data.

38. The system of claim 34 further comprising the remote computing machine receiving the three dimensional graphical data, and displaying the three dimensional graphical data.

39. The system of claim 25 wherein the local computing machine transfers the three dimensional graphics commands to the remote computing machine having a computing element.

40. The system of claim 39 further comprising:
the computing element receiving the three dimensional graphics commands and outputting three dimensional graphical data.

41. The system of claim 39 wherein the local computing machine transfers the three dimensional graphics commands to a graphics engine on the remote computing machine.

42. The system of claim 39 wherein the local computing machine transfers the three dimensional graphics commands to a processor on the remote computing machine, the processor having the capability to receive three dimensional graphics commands and output three dimensional graphical data.

43. The system of claim 39 wherein the local computing machine transfers the three dimensional graphics commands to an application executing on the remote computing machine, the application having the capability to receive three dimensional graphics commands as input and output three dimensional graphical data.

44. The system of claim 39, further comprising the remote computing machine displaying the outputted three dimensional graphical data.

45. The system of claim 25 wherein the local computing machine stores the three dimensional graphics commands prior to transmission.

46. The system of claim 25, wherein the local computing machine is a mobile device.

* * * * *